(12) United States Patent
Museth et al.

(10) Patent No.: US 9,430,870 B2
(45) Date of Patent: Aug. 30, 2016

(54) LEVEL SET SURFACE EDITING OPERATORS

(75) Inventors: Ken Museth, Nörrkoping (SE); David Breen, Elkins Park, PA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 208 days.

(21) Appl. No.: 11/952,446

(22) Filed: Dec. 7, 2007

(65) Prior Publication Data

US 2008/0074419 A1    Mar. 27, 2008

Related U.S. Application Data

(63) Continuation of application No. 10/783,201, filed on Feb. 19, 2004, now Pat. No. 7,542,036.

(60) Provisional application No. 60/448,291, filed on Feb. 19, 2003, provisional application No. 60/499,176, filed on Aug. 28, 2003.

(51) Int. Cl.
    *G06T 17/00*      (2006.01)
    *G06T 19/20*      (2011.01)

(52) U.S. Cl.
    CPC ............... *G06T 17/00* (2013.01); *G06T 19/20* (2013.01); *G06T 2219/2021* (2013.01)

(58) Field of Classification Search
    None
    See application file for complete search history.

(56) References Cited

U.S. PATENT DOCUMENTS

| | | | | |
|---|---|---|---|---|
| 6,075,540 A | * | 6/2000 | Hoppe | 345/419 |
| 7,015,907 B2 | * | 3/2006 | Tek et al. | 345/423 |
| 7,177,471 B2 | * | 2/2007 | Paraglos et al. | 382/173 |
| 2003/0053669 A1 | * | 3/2003 | Suri et al. | 382/130 |
| 2003/0068079 A1 | * | 4/2003 | Park | 382/154 |
| 2004/0019467 A1 | * | 1/2004 | Paragios et al. | 703/2 |

OTHER PUBLICATIONS

Labsik, U., Hormann, K., Meister, M., Greiner, G., Hierarchical Iso-Surface Extraction, Dec. 2002, Journal of Computing and Information Science in Engineering, pp. 323-329.*

(Continued)

*Primary Examiner* — Said Broome
(74) *Attorney, Agent, or Firm* — Lyon & Harr, LLP; Richard T. Lyon

(57) ABSTRACT

The present invention is level set system for implementing interactive editing operators for surfaces. Level set models are deformable implicit surfaces where the deformation of the surface (editing operation) is controlled by a speed function in the level set partial differential equation. The level set system overcomes the self-interaction problems associated with mesh models. One embodiment takes scan converts input models such as polygon mesh, NURBS, CSGS models into level set models. An interface is provided by which models can be edited with editing operators such as blending, smoothing, embossing, etc. One embodiment utilizes several methods to optimize computations related to the editing operators. For example, shortest distance calculations, bounding boxes, numerical integration, and the sparse-field methods are disclosed for the implementation of the level set deformation operator embodiments including blending, smoothing sharpening, and embossing. The resulting level sets model can be volume rendered or extracted to a polygon mesh.

8 Claims, 13 Drawing Sheets

(56) References Cited

OTHER PUBLICATIONS

Museth, K., Breen, D., Whitaker, R., Barr, A., Level Set Surface Editing Operators, Jul. 2002, ACM Transactions on Graphics, Proc. SIGGRAPH, vol. 21, No. 3, pp. 330-338.*

Whitaker, R., Breen, D., Museth, K., Soni, N., A Framework for Level Set Segmentation of Volume Datasets, Jun. 2001, Proceedings of the International Workshop on Volume Graphics, pp. 159-168.*

* cited by examiner

| Modules \ Algorithms | Distance Calculations | Scan Conversion | Closest Point In Set | Fast Marching Methods | Bounding Boxes | Numerical Integration | Narrow Band Methods |
|---|---|---|---|---|---|---|---|
| Input Model Generation | X | X | | X | | | X |
| CSG Operations | | | | | | | X |
| LS Blending | | | X | | X | X | X |
| LS Smoothing/ Sharpening | X | | | | X | X | X |
| LS Embossing | X | | X | | X | X | X |
| Morphological Operations | | | | X | | | X |
| Mesh Extraction | | | | | X | | X |

FIGURE 11

LEVEL SET SURFACE EDITING OPERATORS

This application is a continuation of application Ser. No. 10/783,201 filed on Feb. 19, 2004, now U.S. Pat. No. 7,542,036 issued Jun. 2, 2009. This application claims the benefit of U.S. Provisional Patent Application No. 60/448,291, filed on Feb. 19, 2003, and U.S. Provisional Patent Application No. 60/499,176, filed on Aug. 28, 2003, the disclosure of which is hereby incorporated by reference.

This invention was made with government support under Grant Numbers: ASC-8920219, ACI-9982273 and ACI-0083287 awarded by The National Science Foundation. The government has certain rights in the invention.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

1. Field of the Invention

The present invention relates to the field of graphical editing tools, and in particular, to a method and system for interactive editing of geometric models based on level set operators.

2. Background Art

The creation of complex models for such applications as movie special effects, graphic arts, and computer-aided design can be a time-consuming, tedious, and error-prone process. One particular problem is how to effectively and properly store a 3D object into a digital representation for user manipulation. One of the solutions to the model creation problem is called 3D photography, wherein a 3D object is scanned directly into a digital representation. However, the scanned model is rarely in a final desired form. The scanning process is imperfect and introduces errors and artifacts, or the object itself may be flawed.

3D scans can be converted to polygonal and parametric surface meshes. Many algorithms and systems for editing these polygonal and parametric surfaces have been developed, but surface mesh editing has its limitations and must address several difficult issues. For example, it is difficult to guarantee that a mesh model will not self-intersect when performing a local editing operation based on the movement of vertices or control points, producing nonphysical, invalid results. If self-intersection occurs, it must be fixed as a post-process, which is a tedious task. The self-intersection problem is more acute in cases where the models are changing. Also, when merging two mesh models the process of clipping individual polygons and patches may produce errors when the elements are small and/or thin, or if the elements are almost parallel. In addition while it is not impossible to change the genus of a surface mesh model, it is certainly difficult and requires significant effort to maintain the consistency/validity of the underlying vertex/edge connectivity structure.

There exist several areas of research related to surface editing work. They are volumetric sculpting, mesh-based surface editing/fairing and implicit modeling. Volumetric sculpting provides methods for directly manipulating the voxels of a volumetric model. Constructive Solid Geometry (CSG) Boolean operations are commonly found in volume sculpting systems, providing a straightforward way to create complex solid objects by combining simpler primitives.

Performing CSG operations on mesh models is a long-standing area of research. Recently CSG operations were developed for multi-resolution subdivision surfaces, but this work did not address the problem of blending or smoothing the sharp features often produced by the operations. However, the smoothing of meshes has been studied on several occasions. A method has been developed for fairing irregular meshes using diffusion and curvature flow, demonstrating that mean-curvature based flow produces the best results for smoothing.

Besides explicit models such as polygonal models, there also exists a large body of surface editing work based on implicit models. This approach uses implicit surface representations of analytic primitives or skeletal offsets. One existing method describes an implicit modeling with techniques for performing blending, warping and boolean operations on skeletal implicit surfaces. Another address the converse problem of preventing unwanted blending between implicit primitives, as well as maintaining a constant volume during deformation.

What is desired is a new method of representing and editing 3D objects that allow efficient editing processes and overcome the problem of self-intersection. Furthermore, the method would have editing operators that are based on the mathematics of deforming implicit surfaces and not dependent on surfaces having underlying volumetric representations.

SUMMARY OF THE INVENTION

The present invention relates to the field of graphical editing tools, and in particular to a method and system for interactive editing of 3-D surface models based on level set methods.

One embodiment of the present invention is a level set system for implementing interactive editing operators for surfaces. Level set models are deformable implicit surfaces where the deformation of the surface is controlled by a speed function in the level set partial differential equation. The system allows for input models such as polygon mesh, NURBS, CSGS models by providing a 3D scan conversion component to convert these models into level set models. In one embodiment, the system also provides for scanned volumes to be converted into level set models.

Once in the form of level set models, the present invention provides an interface by which the user can begin to operate on the models. The present invention provides a collection of speed functions that produce a set of surface editing operators, such as blending, smoothing, copy, paste, etc. The speed functions describe the velocity at each point on the evolving surface in the direction of the surface normal. All of the information needed to deform a surface is encapsulated in the speed function, providing a simple, unified computational framework. Because of the implementations of editors of the present invention, the surface editing operators are quickly computed and may be applied both regionally and globally. This allows the user to interactively edit the level set models.

After the application of the level set editing operators to a model, the result can be volume rendered directly or extracted to a polygon mesh. In one embodiment, the method of extracting and rendering Marching Cubes meshes is used.

One embodiment of the present invention is a method of defining a general speed function for describing the surface editing operators. The generality of the speed function construct provides a way by which the user can combine pre-defined building blocks to create the desired speed function.

The level set framework of the present invention offers several improvements over the prior art. First, by construction, self-intersection cannot occur, which guarantees the generation of physically-realizable, simple, closed surfaces. Second, level set models easily change topological genus. Third, level set models are free of the edge connectivity and mesh quality problems associated with mesh models.

Embodiments of the present invention also include calculation methods for enabling the implementation of level set models and level set editing operators. The implementations enable efficient interactive editing sessions.

Since a wide variety of geometric models may be imported into the present system, various algorithms are included in the present invention to perform the necessary conversions, including shortest distance calculations, scan conversion, and the Fast Marching Method. Furthermore, bounding boxes, numerical integration, and the sparse-field methods are disclosed for the implementation of the level set deformation operator embodiments including blending, smoothing sharpening, and embossing. Specifically in one embodiment, blending and embossing operators use K-D trees to quickly find closest points. The smoothing, sharpening and embossing operators utilize shortest distance calculations for localizing computation. The morphological operators employ the Fast Marching Method to calculate the needed distance information.

The present invention further includes a method of mesh extraction that extensively utilizes bounding boxes and the active list of the level set solver to implement an incremental version of the Marching Cubes algorithm.

In another embodiment, the operator modules use some kind of narrow band calculation to either limit computation to only those voxels near the level set of interest, or to re-establish proper distance information in the narrow band after performing its operation.

BRIEF DESCRIPTION OF THE DRAWINGS

These and other features, aspects and advantages of the present invention will become better understood with regard to the following description, appended claims and accompanying drawings where:

FIG. 11 depicts how the various algorithms are used in the present invention;

DETAILED DESCRIPTION OF THE INVENTION

Figure 1:
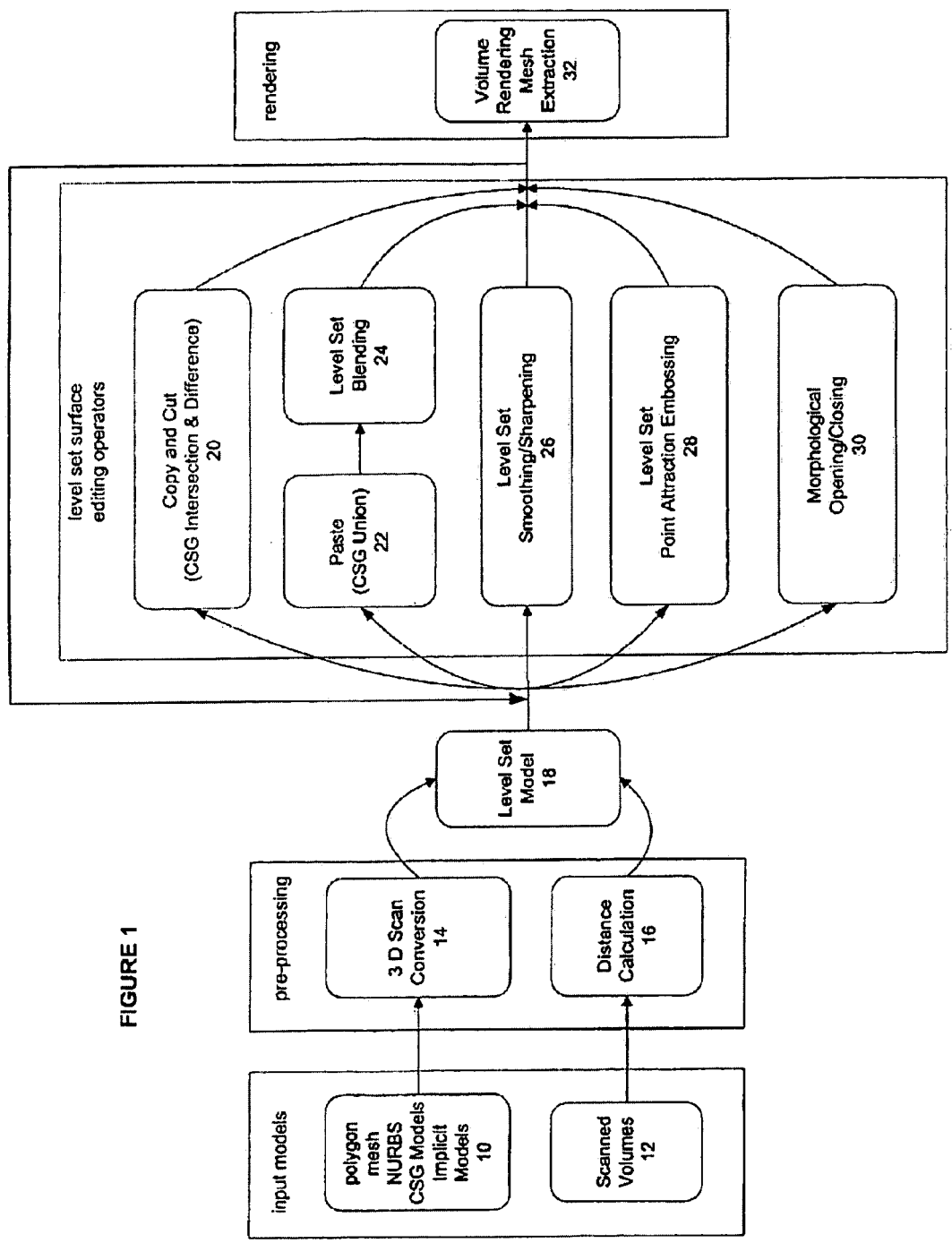
FIG. 1 is a block diagram that outlines the system and method of the present invention.

FIG. 1 is a block diagram that illustrates the system of the present invention. The figure can be viewed as a pipeline, where graphical input models are accepted on the left and processed through the pipeline to the output models to the right. The present system accepts a wide variety of input models. Component 10 shows that examples include polygon mesh, Non-Uniform Rational B-Spline (NURBS), CSG models, and implicit models. Before these models can be used, they are converted into an iso-surface embedded in a distance volume, as indicated by 3D scan conversion block 14. Often only the distance information in a narrow band of voxels surrounding the level set surface needs to be stored. The present invention has a suite of scan conversion methods for converting polygonal meshes, CSG models, implicit primitives, and NURBS surfaces into distance volumes.

Additionally many types of scanning processes produce voluimetric models directly, e.g. MRI, CT and laser range scan reconstruction (component 12). These models may be brought into the level set environment as is or with minimal pre-processing. In one embodiment, these models are segmented with another level set technique, and then the Sethian's Fast Marching Method is applied to convert the results into distance volumes (component 14).

Regardless of the format of the initial input models, once transformed into the appropriate level set model (component 18), they can be interactively edited by using level set surface editing operators 20, 22, 24, 26, 28, and 30. These operators provide the basic functions necessary for 3D model editing.

Component 20 is a copy and cut component (CSG Intersection and Difference) while component 22 is a paste component (CSG Union). Component 24 is a blending function, component 26 is a smoothing/sharpening function, and component 28 is a point attraction embossing function. Finally, component 30 is a morphological opening/closing component. Embodiments of the present invention provide for interactive application of any combination of these level set surface editing operators to achieve the desired results. One embodiment of the present invention is a user interface provided for interactively editing models.

After the application of the level set editing operators to a model, the result can be volume rendered directly or extracted to a polygon mesh (component 32). In one embodiment, the method of extracting and rendering Marching Cubes meshes is used.

The method and system of level set surface modeling and editing are further described in the following three main sections. First, level set surface modeling is disclosed. Second, the level set surface operator embodiments shown in FIG. 1 are further described in details. Third, a set of algorithms are described for optimizing the implementation of level set modeling and level set surface operators.

1 Level Set Surface Modeling

The graphical editing operators of the present invention are based on the Level Set Method. The Level Set Method is a mathematical tool for modeling surface deformations. A deformable (i.e. time-dependent) surface is implicitly represented as an iso-surface of a time-varying scalar function, $\phi(x,t)$, embedded in 3D, i.e.

$$S_{(t)} = \{x(t) | \phi(x(t),t) = k\}, \quad (1)$$

where $k \in \Re$ is the iso-value, $t \in \Re^+$ is time, and $x(t) \in \Re^3$ is a point in space on the iso-surface. It might seem inefficient to implicitly represent a surface with a 3D scalar function; however the higher dimensionality of the representation provides one of the major advantages of the LS method: the flexible handling of changes in the topology of the deformable surface. This implies that LS surfaces can easily represent complicated surface shapes that can, form holes, split to form multiple objects, or merge with other objects to form a single structure.

The fundamental level set equation of motion for $\phi(x(t),t)$ is derived by differentiating both sides of Eq. (1) with respect to time t, and applying the chain rule giving:

$$\frac{\partial \phi}{\partial t} = -\nabla \phi \cdot \frac{dx}{dt}, \quad (2)$$

where dx/dt denotes the speed vectors of the level set surface.

There exists a number of numerical techniques that make the initial value problem of Eq. (2) computationally feasible. One important technique is the so called "up-wind scheme" which addresses the problem of overshooting when trying to solve Eq. (2) by a simple finite forward difference scheme. The other is related to the fact that one is typically only interested in a single solution to Eq. (2), say the k=0 level set. This implies that the evaluation of $\phi$ is important only in the vicinity of that: level set. This forms the basis for "narrow-band" schemes that solve Eq. (2) in a narrow band of voxels containing the surface. The "up-wind scheme" makes the level set method numerically robust, and the "narrow-band scheme" makes its computational complexity proportional to the level set's surface area rather than the size of the volume in which it is embedded.

1.1 LS Speed Function Building Blocks

The basic mathematical foundation of the editing operators is given as follows. Given the definition $$\mathcal{F}(x, n, \phi, \ldots) \equiv n \cdot \frac{dx}{dt}, \quad (3)$$

the fundamental level set equation, Eq. (2), can be rewritten as $$\frac{\partial \phi}{\partial t} = |\nabla \phi| \mathcal{F}(x, n, \phi, \ldots) \quad (4)$$

where dx/dt and $n = -\nabla\phi/|\nabla\phi|$ are the velocity and normal vectors at x on the surface.

In the present invention, the assumption is that a positive-inside/negative-outside sign convention for $\phi(x,t)$, i.e. n points outwards. Eq. (3) introduces the speed function $\mathcal{F}$, which is a user-defined scalar function that can depend on any number of variables including x, n, $\phi$ and its derivatives evaluated at x, as well as a variety of external data inputs.

$\mathcal{F}()$ is a signed scalar function that defines the motion (i.e. speed) of the level set surface in the direction of the local normal n at x.

The speed function is usually based on a set of geometric measures of the implicit level set surface and data inputs. The challenge when working with level set methods is determining how to combine the building blocks to produce a local motion that creates a desired global or regional behavior of the surface.

Figure 2:
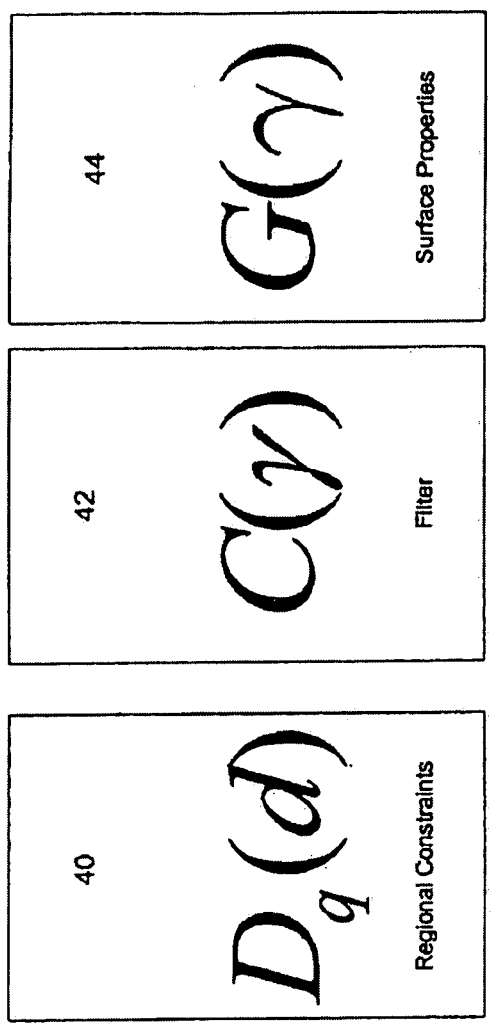
FIG. 2 is a block diagram showing the general speed function according to an embodiment of the present invention.

As shown below and in FIG. 2, the general structure for the speed functions used in the surface editing operators of the present invention is thus $$\mathcal{F}(x,n,\phi) = \mathcal{D}_q(d) \mathcal{C}(\gamma) \mathcal{G}(\gamma). \quad (5)$$

Component 40, $\mathcal{D}_q(d)$, is a distance-based cut-off function that depends on a distance measure d to a geometric structure q. Component 40 regionally constrains the speed function. For example, if the operator is a blending operator, the $\mathcal{D}_q(d)$ allows the user to define an area where blending is to occur.

Component 42, $\mathcal{C}(\gamma)$, is a cut-off function that controls the contribution of $\mathcal{G}(\gamma)$ to the speed function. It is a filter function of local geometric surface properties. As such, it provides direct user control of local geometric surface properties (as denoted by $\gamma$). These local geometric surface properties are typically zero order (like distance), first order (like normal directions) or second (like curvature) properties of the level set function (denoted by the $\phi$).

Component 44, $\mathcal{G}(\gamma)$, is a function that depends on geometric measures $\gamma$ derived from the level set surface, e.g. curvature. It is a "flow-function of local geometric surface properties". Note that these local geometric surface properties are the same as the one entering component 42 $\mathcal{C}(\gamma)$, as described above. Component 44 ($\mathcal{G}(\gamma)$) maps the geometric properties to actual surface speeds or flow. In other word, component "encodes" or "defines" the overall behavior of the level set operator—whereas the other two terms regionally constraints its influence, as well as limiting it effect to certain values of the geometric properties $\gamma$.

Thus, $\mathcal{D}_q(d)$ acts as a region-of-influence function that regionally constrains the LS calculation. As such, it determines where editing should take place. $\mathcal{C}(\gamma)$ is a filter of the geometric measure and $\mathcal{G}(\gamma)$ provides the geometric contribution of the level set surface. In general $\gamma$ is defined as zero, first, or second order measures of the LS surface.

1.2 Regionally Constraining LS Deformations

Figure 3:
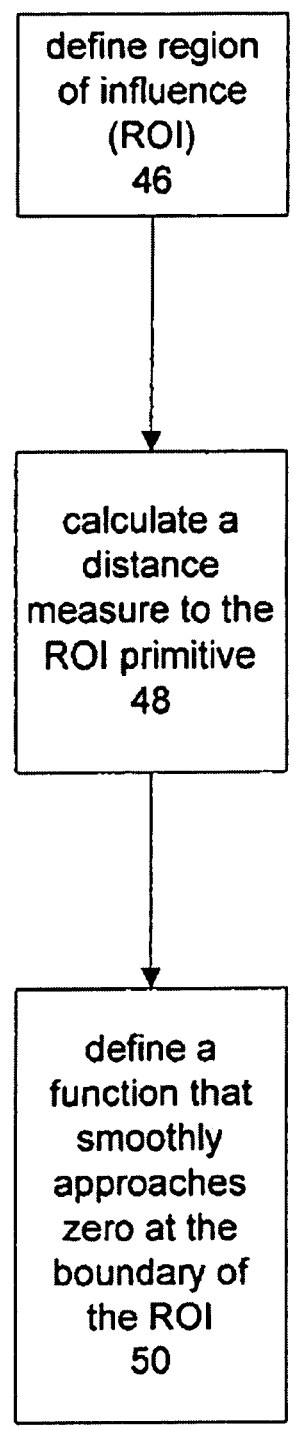
FIG. 3 is a block diagram that illustrates the process of regionally constraining a level set deformation according to an embodiment of the present invention.

In order to be achieve efficiency and usefulness, most of the surface operators may be applied locally in a small user-defined region on the edited surface. In order to regionally restrict the deformation during the level set computation, a technique is needed for driving the value of $\mathcal{F}()$ to zero outside of the region. This is accomplished in three steps, as shown in FIG. 3.

The first step, step 46, involves defining the region of influence (ROI), i.e. the region where $\mathcal{F}()$ should be non-zero. This is done by either the user interactively placing a 3D object around the region, or by automatically calculating a region from properties of the surface. Both cases involve defining a geometric structure that is referred to as a "region-of-influence (ROI) primitive". The nature of these primitives will vary for the different LS operations and will be explicitly defined when the operators are described in details. The second step, step 48, consists of calculating a distance measure to the ROI primitive. This is followed by step 50, which involves defining a function that smoothly approaches zero at the boundary of the ROI.

A region-of-influence function is defined as $\mathcal{D}_q(d)$ in Eq. (5) (component 40 of FIG. 2), where d is a distance measure from a point on the level set surface to the ROI primitive q. The functional behavior of $\mathcal{D}_q(d)$ clearly depends on the specific ROI primitive, q. In one embodiment, the following piecewise polynomial function has been found to be useful as a common speed function building block:

$$P(\beta) = \begin{cases} 0 & \text{for } \beta \leq 0 \\ 2\beta^2 & \text{for } 0 < \beta \leq 0.5 \\ 1 - 2(\beta - 1)^2 & \text{for } 0.5 < \beta < 1 \\ 1 & \text{for } \beta \geq 1. \end{cases} \quad (6)$$

$P(\beta)$ and its derivatives are continuous and relatively inexpensive to compute. Other continuous equations with the same basic shape would also be satisfactory. Building of this further, the present invention defines $$\mathcal{P}(d; d_{min}, d_{max}) \equiv P\left(\frac{d - d_{min}}{d_{max} - d_{min}}\right) \quad (7)$$

where $d_{min}$ and $d_{max}$ are user-defined parameters that define the limits and sharpness of the cut-off. Finally the following region-of-influence functions emerge $$\mathcal{D}_p(d) = 1 - \mathcal{P}(d; d_{min}, d_{max}) \quad (8a)$$

$$\mathcal{D}_s(d) = \mathcal{P}(d; 0, d_{max}) \quad (8b)$$

for a point set, p, and a closed surface, s.

In Eq. (8a) d denotes the distance from a point on the level set surface to the closest point in the point set p. In Eq. (8b) d denotes a signed distance measure from a point on the level set surface to the implicit surface s. The signed distance measure does not necessarily have to be Euclidean distance—just a monotonic distance measure following the positive-inside/negative-outside convention. Note that $\mathcal{D}_p(d)$ is one when the shortest distance, d, to the point set is smaller than $d_{min}$, and decays smoothly to zero as d increases to $d_{max}$, after which it is zero. $\mathcal{D}_s(d)$, on the other hand, is zero everywhere outside, as well as on, the surface s(d≤0), but one inside when the distance measure d is larger than $d_{max}$.

An additional benefit of the region-of-influence functions is that they define the portion of the volume where the surface cannot move. This information is used to determine what voxels should be updated during the level set deformation, significantly lowering the amount of computation needed when performing editing operations. This technique allows the editing operators to be rapidly computed when modifying large models.

1.3 Limiting Geometric Property Values

A number of geometric properties are calculated from the level set surface. The zero order geometric property that is utilized is shortest distance from the level set surface to some ROI primitive. The first order property is the surface normal, $n \equiv -\nabla\phi/|\nabla\phi|$. The second order information includes a variety of curvature measures of the LS surface. A more detailed discussion of a numerical approach to deriving the mean, Gaussian and principle curvatures of a level set surface is in Section 3.3.3 titled "Non-linear Speed Functions." The scheme of calculation of the present invention has numerical advantages relative to traditional central finite difference schemes for computing the second order derivatives. In one embodiment, mean curvature is found to be the most useful second order measure for the present invention.

Another desirable feature of operators of the present invention is that they allow the user to control the geometric properties of surface in the region being edited. This feature is implemented with another cut-off function, $\mathcal{C}(\ )$ (component 42 of FIG. 2), within the level set speed function. $\mathcal{C}(\ )$ allows the user to slow and then stop the level set deformation as a particular surface property approaches a user-specified value.

Reusing the cut-off function, Eq. (7), defined in the previous section, as a building block for $\mathcal{C}(\ )$. $\mathcal{C}(\ )$ is defined as $$C(\gamma) = \begin{cases} \mathcal{P}(\gamma; \gamma_{min}^{low}, \gamma_{max}^{low}) & \text{for } \gamma \leq \bar{\gamma} \\ 1 - \mathcal{P}(\gamma; \gamma_{min}^{high}, \gamma_{max}^{high}) & \text{for } \gamma > \bar{\gamma} \end{cases} \quad (9)$$

where $\bar{\gamma} \equiv \gamma_{max}^{low} + \gamma_{min}^{high})/2$. The four parameters $\gamma_{min}^{low}$, $\gamma_{max}^{low}$, $\gamma_{min}^{high}$, and $\gamma_{max}^{high}$ define respectively the upper and lower bounds of the cut-off function.

1.4 Constraining the Direction of LS Motions

Another important feature of the level set framework is its ability to control the direction of the level set deformation. Embodiments of the present invention are able to restrict the motion of the surface to only add or remove material during the level set editing operations. At any point the level set surface can only move in the direction of the local surface normal. Hence, the speed function can simply be redefined as min($\mathcal{G}$,0) (component 44 of FIG. 2) to remove material (inward motion only) and max($\mathcal{G}$,0) to add material (outward motion only). In the case of curvature driven speed functions this produces min/max flows. Of course no restriction on the direction of the motion need be imposed.

2 Definition of Surface Editing Operators

Given the building blocks described in the previous section, the level set surface editing operators outlined in FIG. 1 may be defined. Embodiments of the present invention define the well-known CSG operations such as copy, past, and cut, operations that are essential to most editing systems. Furthermore, new level set speed functions that implement surface editing operators of the present invention are defined by combining the geometric measures with the region-of-influence and cut-off functions.

2.1 CSG Operations

Since level set models are volumetric, the constructive solid geometry (CSG) operations of union, difference and intersection may be applied to them. This provides a straightforward approach to implementing copy, cut and paste operations on level set surfaces (components 20, 22, and 24 of FIG. 1). In the level set framework of the present invention, with a positive-inside/negative-outside sign convention for the distance volumes, these are implemented as min/max operations on the voxel values as summarized in Table 1. Any two closed surfaces represented as signed distance volumes can be used as either the main edited model or the cut/copy primitive. In editing system of the present invention, the user is able to arbitrarily scale, translate and rotate the models before a CSG operation is performed.

TABLE 1

Implementation of CSG operations on two level set models, A and B, represented by distance volumes $V_A$ and $V_B$ with positive inside and negative outside values.

| Action | CSG Operation | Implementation |
|---|---|---|
| Copy | Intersection, A ∩ B | Min($V_A$, $V_B$) |
| Paste | Union, A ∪ B | Max($V_A$, $V_B$) |
| Cut | Difference, A − B | Min($V_A$, −$V_B$) |

2.2 Automatic Localized LS Blending

The surface models produced by the CSG paste operation typically contain sharp and sometimes jagged creases at the intersection of the two surfaces. One method in the present invention dramatically improves this region of the surface by applying an automatic localized blending (component 24 of FIG. 1).

The method is automatic because it only requires the user to specify a few parameter values. It is localized because the blending operator is only applied near the surface intersection region. One possible solution to localizing the blending is to perform the deformation in regions near both of the input surfaces. However, this naive approach would result in blending the two surfaces in all regions of space where the surfaces come within a user-specified distance of each other, creating unwanted blends. A better solution, and the one used in one embodiment of the present invention, involves defining the region of influence based on the distance to the intersection curve shared by both input surfaces. A sampled representation of this curve is the set of voxels that contains a zero distance value (within some sub-voxel value ϵ) to both surfaces. It has been found that this approximate representation of the intersection curve as a point set to be sufficient for defining a shortest distance d for the region-of-influence function, $\mathcal{D}_p(d)$, cf Eq. (5). Representing the intersection curve by a point set allows the curve to take an arbitrary form—it can even be composed of multiple curve segments without introducing any complications to the computational scheme.

The blending operator moves the surface in a direction that minimizes a curvature measure, $\mathcal{K}$, on the level set surface. This is obtained by making the speed function, $\mathcal{G}$, Eq. (5), proportional to $\mathcal{K}$, leading to the following blending speed function:

$$\mathcal{F}_{blend}(x,n,\phi) = \alpha \mathcal{D}_p(d) \mathcal{C}(\mathcal{K}) \mathcal{K} \qquad (10)$$

where α is a user-defined positive scalar that controls the rate of convergence of the LS calculation, $\mathcal{D}_p(d)$ is defined in Eq. (8a) where d is the shortest distance from the level set surface to the intersection curve point set, and $\mathcal{C}(\mathcal{K})$ is given by Eq. (9). $\mathcal{K}$ is the curvature term, and is further described in Section 3.3.3, titled "Non-linear Speed Functions." Through the functions $\mathcal{D}_p$ and $\mathcal{C}$ the user has full control over the region of influence of the blending ($d_{min}$ and $d_{max}$) and the upper and lower curvature values of the blend ($\gamma_{min}^{low}$, $\gamma_{max}^{low}$, and $\gamma_{min}^{high}$, $\gamma_{max}^{high}$). Furthermore a control can be use to determine whether the blend adds or removes material, or both as described in Section 1.4.

Figure 4:
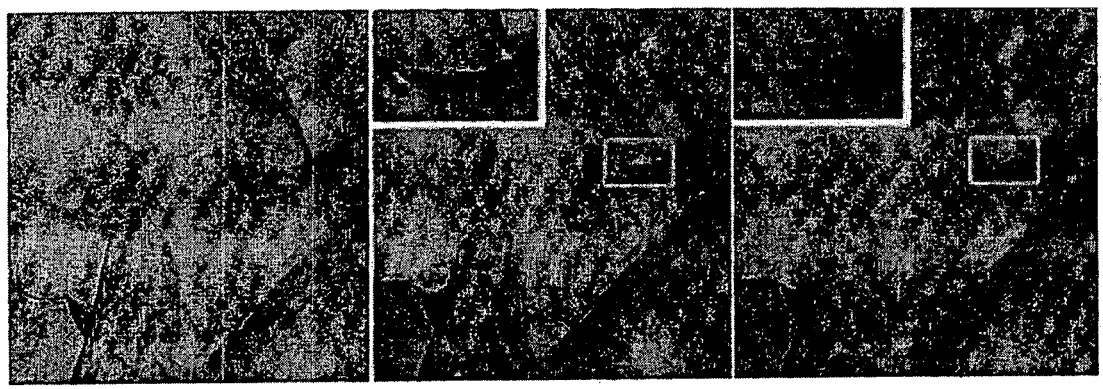
FIG. 4 shows an example of the work done by the blending operator.

Automatic blending is demonstrated in FIG. 4. A wing model is positioned relative to a dragon model. The two models are pasted together and automatic mean curvature-based blending is applied to smooth the creased intersection region. In the left panel, the wing model is positioned onto the dragon model. In the middle panel, the models are pasted together (CSG union operation), producing sharp, undesirable creases, a portion of which is expanded in the box. Finally, the right panel shows the same region after automatic blending based on mean curvature. The blending is constrained to only move outwards. The models are rendered with flat-shading to highlight the details of the surface structure.

2.3 Localized LS Smoothing/Sharpening

The smoothing operator (component 26 of FIG. 1) smoothes the level set surface in a user-specified region. This is accomplished by enclosing the region of interest by a geometric primitive. The "region-of-influence primitive" can be any closed surface for which there is signed inside/outside information, e.g. a level set surface or an implicit primitive. One embodiment of the present invention uses superellipsoids as a convenient ROI primitive, a flexible implicit primitive defined by two shape parameters. The surface is locally smoothed by applying motions in a direction that reduces the local curvature. This is accomplished by moving the level set surface in the direction of the local normal with a speed that is proportional to the curvature. Therefore the speed function for the smoothing operator is $$\mathcal{F}_{smooth}(x,n,\phi) = \alpha \mathcal{D}_s(d) \mathcal{C}(\mathcal{K}) \mathcal{K} \qquad (11)$$

Here d denotes the signed value of the monotonic inside/outside function of the ROI primitive s evaluated at x. As before, $\mathcal{D}_s(d)$ ensures that the speed function smoothly goes to zero as x approaches the boundary of the ROI primitive. $\mathcal{C}(\mathcal{K})$ limits the value of the surface's curvature within the ROI-primitive.

Thus, if the operator is constrained to move outward, it smoothes by adding material. If the operator is constrained to move inward, it smoothes by removing material. A sharpening operator is obtained by simply inverting the sign of α in Eq. (11) and applying an upper cut-off to the curvature in $\mathcal{C}(\ )$ in order to maintain numerical stability.

2.3.1 Examples of Smoothing

Figure 5:
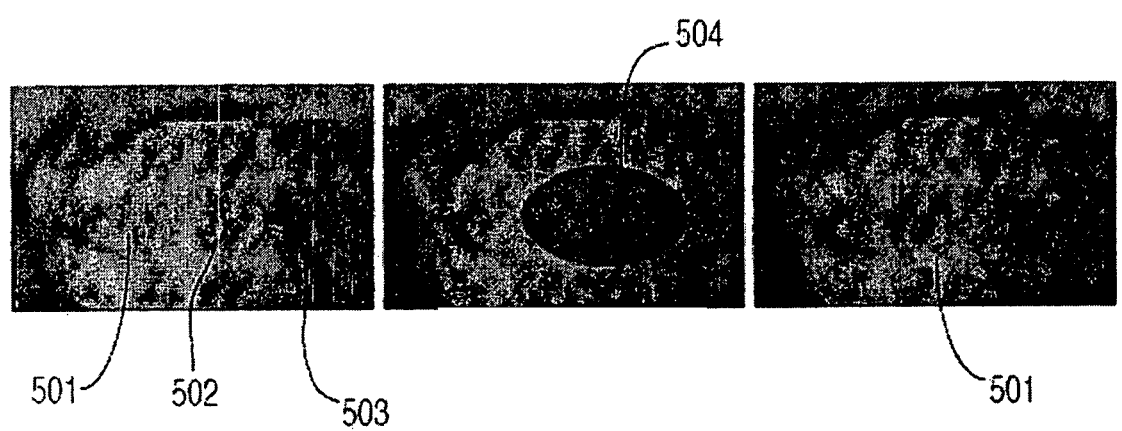
FIG. 5 shows an example of the work done by the smoothing operator.

FIG. 5 demonstrates the smoothing operator of the present invention applied to a laser scan reconstruction. The left panel shows that laser scan reconstruction left unwanted, pointed artifacts in the eye. Then, the middle panel shows that a superellipsoid around the region of interest to define the region to be smoothed. The right panel shows that, after smoothing, unwanted artifacts are removed from the eye. In this case, a smoothing operator constrained to only remove material is applied and the spiky artifacts are removed.

Figure 6:
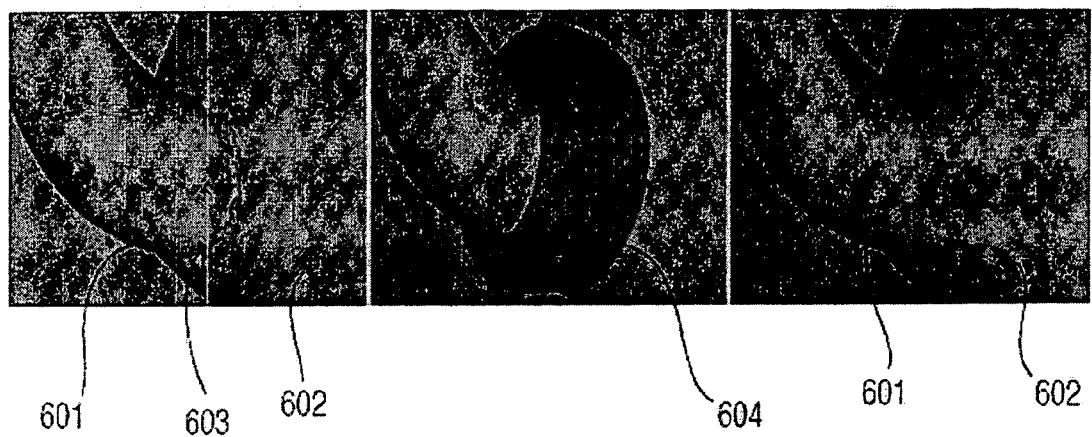
FIG. 6 shows another example of the work done by the smoothing operator.

In another example, FIG. 6, demonstrates the smoothing operator applied to a preliminary 3D scan conversion of the Utah teapot. Unwanted artifacts are removed from the region where the spout meets the body of the teapot by first placing a superellipsoid around the region of interest. The left panel shows that scan conversion left errors near the teapot spout. In the middle panel, a superellipsoid is placed around the errors. The right panel shows that the errors are smoothed away. A smoothing operator constrained to only add material (move outward) is applied and the crevices are removed.

Figure 7:
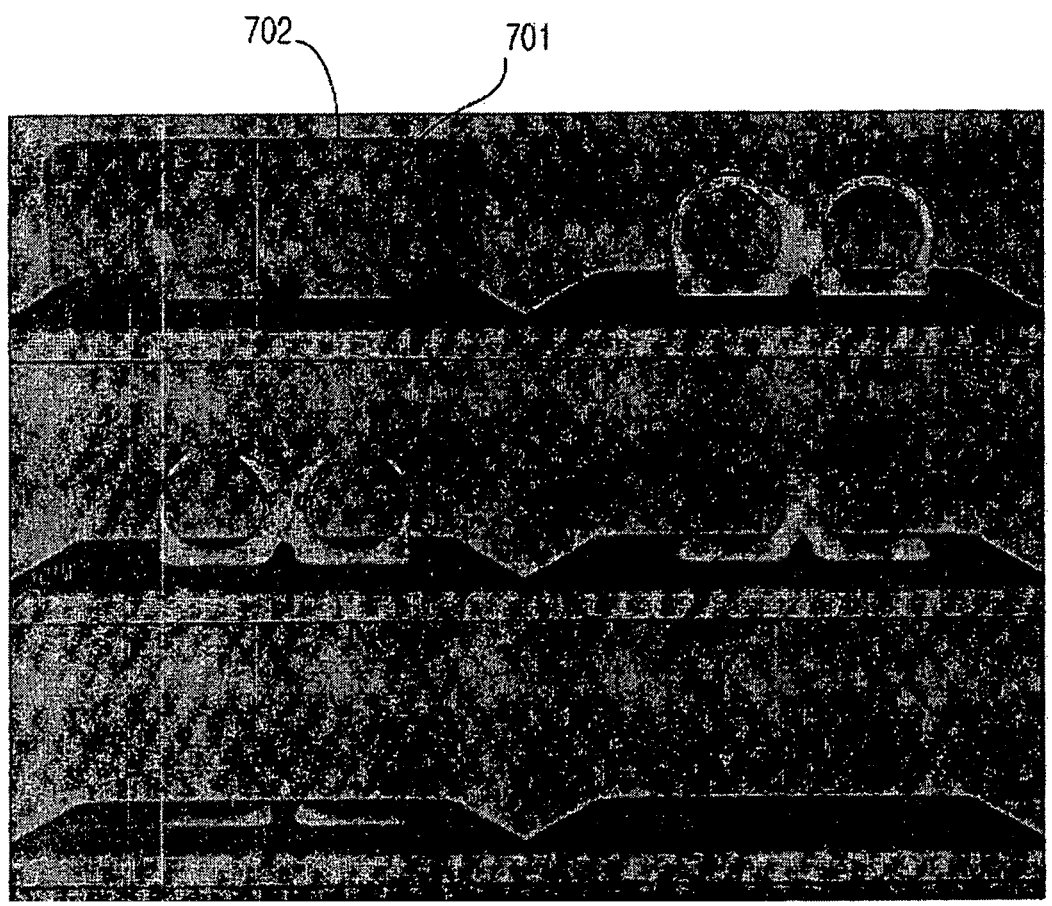
FIG. 7 shows another example of the work done by the smoothing operator.

Finally, an artificial smoothing example is shown in FIG. 7, where a complex structure is completely smoothed away. This example illustrates that changes of topological genus and number of disconnected components are easily handled within a level set framework during smoothing. The superellipsoid defines the portion of the surface to be smoothed. The surface is constrained to move only inwards (smooth by removing material).

2.4 Point Set Attraction and Embossing

An embodiment of the present invention is an operator that attracts and repels the surface towards and away from a point set (component 28 of FIG. 1). These point sets can be samples of lines, curves, planes, patches and other geometric shapes, e.g. text. By placing the point sets near the surface, the operator is able to emboss the surface with the shape of the point set. Similar to the smoothing operator, the user encloses the region to be embossed with a ROI primitive e.g. a superellipsoid. The region-of-interest function for this operator is $\mathcal{D}_s(d)$, Eq. (8b).

First, assume that all of the attraction points are located outside the LS surface. p denotes the attraction point in the set that is closest to x, a point on the LS surface. The operator only allows the LS surface to move towards p if the unit-vector, $u \equiv (p-x)/|p-x|$, is pointing in the same direction as the local surface normal n at x. Hence, the speed function should only be non-zero when $0 < n \cdot u \leq 1$. Since the sign of $n \cdot u$ is reversed if p is instead located inside the LS surface, the operator simply requires $\gamma \equiv -\text{sign}[\phi(p,t)] n \cdot u$ to be positive for any closest attraction point p. This amounts to having only positive cut-off values for $\mathcal{C}(\gamma)$. Finally letting $\mathcal{G} = -\alpha\phi$ (p,t) will guarantee that the LS surface will stop once it reaches p. In one embodiment of the present invention, the following speed function implements the point set attraction operator:

$$\mathcal{F}_{point}(x,n,\phi) = -\alpha \mathcal{S}_s(d) \mathcal{C}(\gamma) \phi(p,t), \quad (12)$$

where d is a signed distance measure to a ROI primitive evaluated at a on the LS surface, p is the closest point in the set to x, and γ is defined in the text above. The shape of the primitive and the values of the four positive parameters in Eq. (9) define the footprint and sharpness of the embossing.

Figure 8:
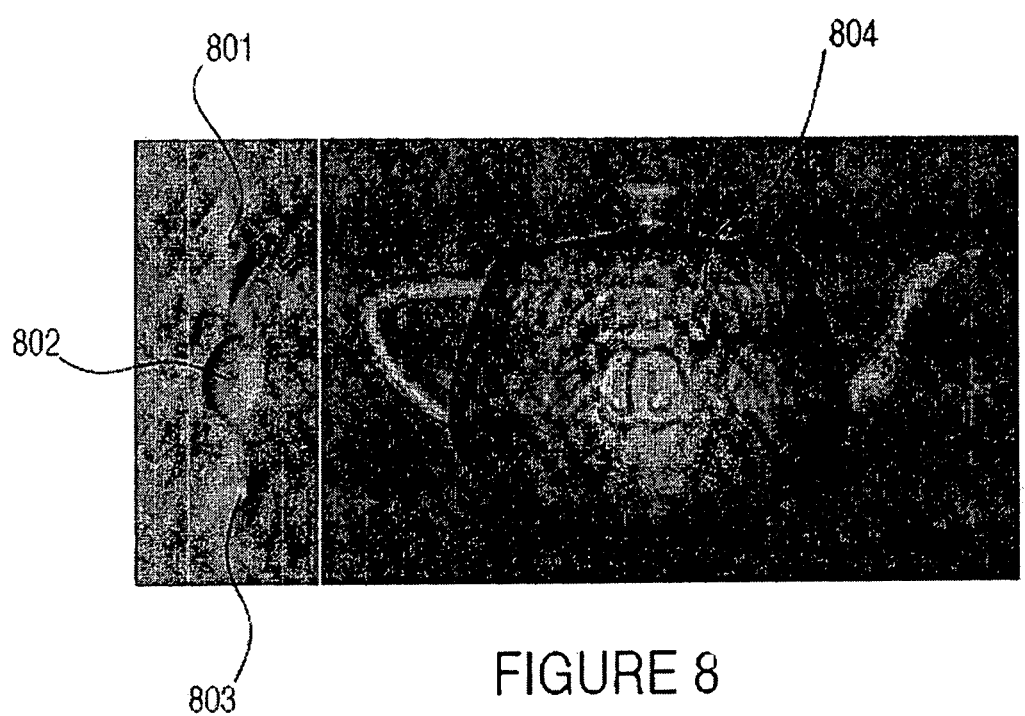
FIG. 8 shows an example of the work done by the embossing operator.

FIG. 8 provides an example of embossing. The left panel of FIG. 8 shows three types of single point attractions/repulsions using different ROI primitives and γ values. Point repulsion is obtained by making a negative. Note that Eq. (12) is just one example of many possible point set attraction speed functions. The right panel shows the Utah teapot embossed with 7862 points that have been acquired by scanning an image of the SIGGRAPH 2002 logo and warping the points to fit the shape of the teapot.

2.5 Global Morphological Operators

In one embodiment of the present invention, the level set operators are adapted to locally deform a level set surface. However, if the user wishes to perform a global smoothing of a level set surface, it is preferable to use an operator other than $\mathcal{F}_{smooth}$. For a global smoothing the level set propagation is computed on the whole volume, which can be slow for large volumes. However, in this case morphological opening and closing operators, as described by Serra, J. in *Image Analysis and Mathematical Morphology*, published by Academic Press in London, in 1982, offer faster alternatives to global smoothing of level set surfaces.

Prior publication by Sapiro, G. in *Geometric Partial Differential Equations and Image Analysis*, published by Cambridge University Press of Cambridge, UK in 2001 and Maragos, P. in Differential Morphology and Image Processing, *IEEE Trans. on Image Processing* 5, June, 922-937, describe morphological operators within a level set framework. One embodiment of the present invention has implemented them for the morphological component 30 of FIG. 1.

Morphological openings and closings consist of two fundamental operators, dilations $D_\omega$ and erosions $E_\omega$. Dilation creates an offset surface a distance ω outwards from the original surface, and erosion creates an offset surface a distance ω inwards from the original surface. The morphological opening operator $O_\omega$ is: an erosion followed by a dilation, i.e. $O_\omega = D_\omega \circ E_\omega$, which removes small pieces or thin appendages. A closing is defined as $C_\omega = E_\omega \circ D_\omega$, and closes small gaps or holes within objects.

Figure 9:
FIG. 9 shows an example of the work done by the morphological operator.

Morphological operators may be implemented by solving a special form of the level set equation, the Eikonal equation, $\pm \partial \phi / \partial t = |\nabla \phi| = 1$, up to a certain time t, utilizing Sethian's Fast Marching Method, as described by Sethian J. in A fast marching level set method for monotonically advancing fronts, in *Proceedings of the National Academy of Science*, vol. 93, 1591-1595. The value of t corresponds to the offset distance, w, from the original surface, $\phi(t=0)$. FIG. 9 contains a model from a laser scan reconstruction that has been smoothed with an opening operator with ω equal to 3.

2.6 Editing Session Details

Figure 10:
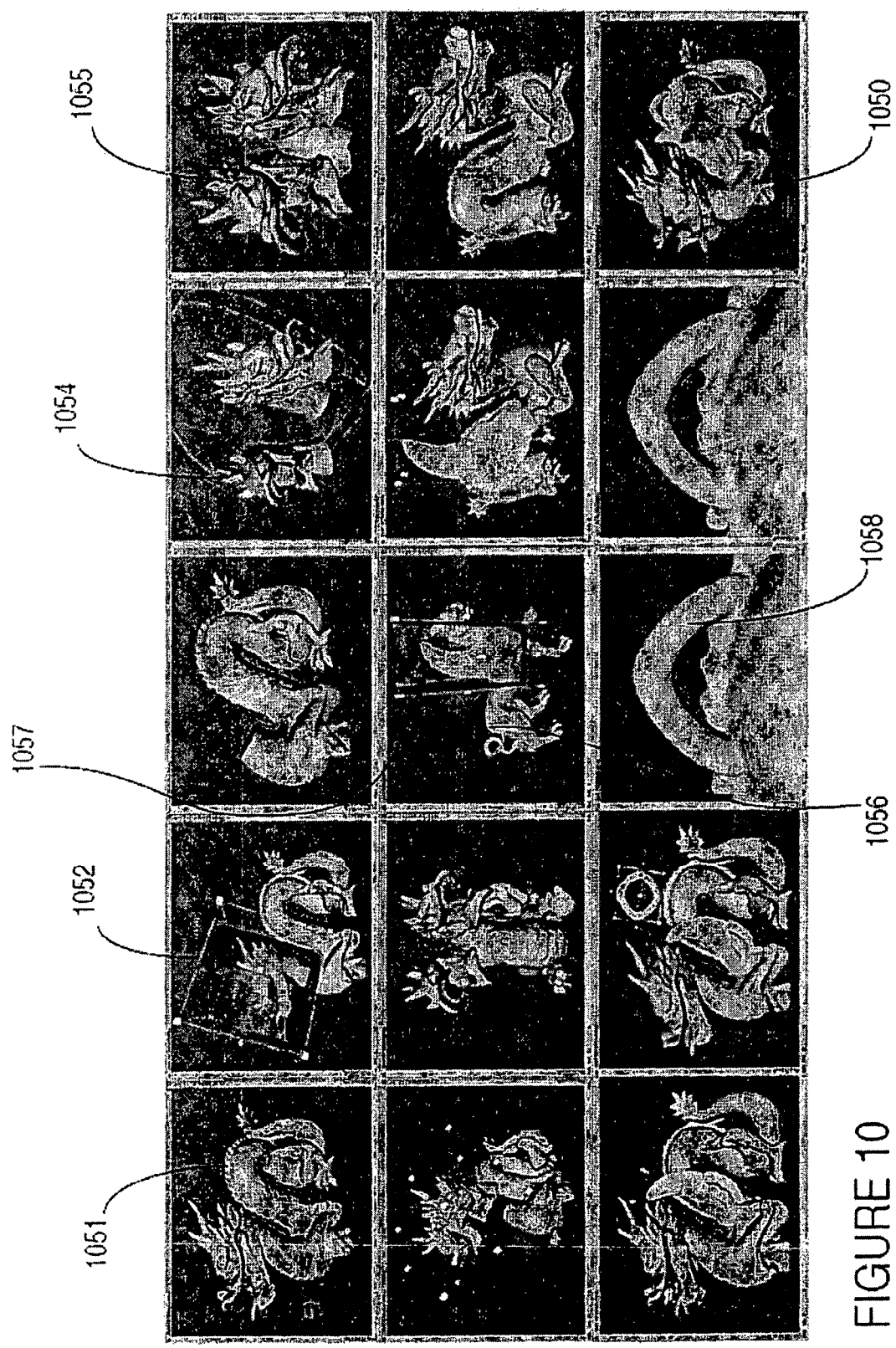
FIG. 10 contains a series of screen shots taken of the level set modeling program according to an embodiment of the present invention.

FIG. 10 contains a series of screen shots taken of the level set modeling user interface program of the present invention. The screen shots depict the actions of constructing an example two-headed winged dragon. The first shows the original dragon model loaded into the system. A cylindrical primitive is placed around its head and it is cut off. The model of the head is duplicated and the two heads are positioned relative to each other. Once the user is satisfied with their orientation, they are pasted together and an automatic blending is, performed at the intersection seam. The combined double head model is positioned over the cropped neck of the dragon body. The double head is pasted and blended onto the body. The griffin model is loaded into the LS modeling system. A primitive is placed around one of its wings. The portion of the model within the primitive is copied, being stored in a buffer. Several cutting operations are used to trim the wing model (not shown). The double-headed dragon model is loaded, and the wing is positioned, pasted and blended onto it. A mirror copy of the wing model is created. It is also positioned, pasted and blended onto the other side of the double-headed dragon. A loop is then added onto the dragon's back as if designing a bracelet charm. This is accomplished by positioning, pasting, and blending a scan-converted supertoroid, producing the final model seen in the bottom right.

3 Algorithms Implementation

The level set modeling and operator embodiments rely on underlying algorithms. This section describes the main algorithms employed by the level set modeling system of the present invention. The algorithms, which are selected to optimize the performance of the editing operators, may be placed in three categories: distance computations, level set evolutions, and efficient mesh extractions. Algorithms for distance computations are described in Section 3.3. Algorithms for efficient mesh extractions are described in Section 3.4.

FIG. 11 identifies the specific algorithms utilized in each of the modules in the interactive level set model editing system of the present invention. Since a wide variety of geometric models may be imported into the present system, many algorithms are needed to perform the necessary conversions, including shortest distance calculations (further described in Sections 3.2.3, 3.2.4), scan conversion (further described in Section 3.2.2) and the Fast Marching Method (further described in Section 3.2.6).

As for the level set deformation operators (blending, smoothing, sharpening and embossing), in one embodiment many of these operators use bounding boxes (further described in Section 3.3.6), numerical integration (further described in Section 3.3) and the sparse-field techniques (further described in Section 3.3.5). In one embodiment, the blending and embossing operators use K-D trees (further described in Section 3.2.5) to quickly find closest points. The smoothing, sharpening and embossing operators utilize shortest distance calculations (further described in Section 3.2.3) for localizing computation. In another embodiment, the morphological operators employ the Fast Marching Method (further described in Section 3.2.6) to calculate the needed distance information.

In one embodiment, the mesh extraction algorithm also extensively utilizes bounding boxes and the active list of the level set solver to implement an incremental version of the Marching Cubes algorithm.

In one or more embodiments, all of the modules use some kind of narrow band calculation to either limit computation to only those voxels near the level set of interest (further described in Section 3.3.5), or to re-establish proper distance information in the narrow band after performing its operation (further described in Section 3.2.1).

3.1 Geometric Properties

The speed function, $\mathcal{F}$, introduced in Section 1, typically depends on different geometric properties of the level set surface. These properties can conveniently be expressed as either zero, first or second order derivatives of $\phi$. Examples hereof include the shortest distance from an arbitrary point to the surface, the local surface normal and different curvature measures. Assuming $\phi$ is properly normalized, the distance is simply the numerical value of $\phi$, and as indicated above the normal vector is just a normalized gradient of $\phi$. The latter is easily proved by noting that the directional derivative in the tangent plane of the level set function by definition vanishes, i.e.

$$\frac{d\phi}{dT} \equiv T \cdot \nabla \phi = 0 \quad (13)$$

where T is an arbitrary unit vector in the tangent plane of the level set surface. We have many different curvature measures for surfaces, but as has been noted by others geometric flow based on the mean curvature seems to be most useful. From the definition of the mean curvature in differential geometry, it is noted that $$K \equiv K_1 + K_2 \equiv Div_{e_1}[n] + Div_{e_2}[n] \quad (14a)$$

$$= e_1(e_1 \cdot \nabla) \cdot n + e_1(e_1 \cdot \nabla) \cdot n \quad (14b)$$

where $\{K_1, K_2\}$ are the principle curvatures and $Div_{e_1}[n]$ denotes the divergence of the normal vector n in the principle direction $e_1$. Next, resolving the gradient operator in the orthonormal frame of the principle directions $\{e_1, e_2\}$ in the tangent plane and the normal vector n $$\nabla = e_1(e_1 \cdot \nabla) + e_2(e_2 \cdot \nabla) + n(n \cdot \nabla), \quad (15)$$

Eq. (14b) simplifies to $$K = \nabla \cdot n - n(n \cdot \nabla) \cdot n \quad (16a)$$

$$= \nabla \cdot n = \nabla \cdot \frac{\nabla \phi}{|\nabla \phi|}. \quad (16b)$$

where the present invention has also made used of the following relations $$n(n \cdot \nabla) \cdot n = \sum_j n_j \sum_i n_i \nabla_i n_j = \sum_{ij} n_i n_j \nabla_i [n_j] \quad (17a)$$

$$= \sum_{ij} n_i \frac{1}{2} \nabla_i [n_j^2] = \frac{1}{2} \sum_i n_i \nabla_i \left[ \sum_j n_j^2 \right] \quad (17b)$$

$$= \frac{1}{2} \sum_i n_i \nabla_i [1] = 0. \quad (17c)$$

since the normal vector is always normalized to one. Eq. (16b) can finally be expanded to obtain an expression directly in terms of derivatives of $\phi$ $$K = (\phi_x^2(\phi_{yy} + \phi_{zz}) - 2\phi_x \phi_y \phi_{xy} + \phi_y^2(\phi_{xx} + \phi_{zz}) - \quad (18)$$
$$2\phi_x \phi_z \phi_{xz} + \phi_z^2(\phi_{xx} + \phi_{yy}) - 2\phi_y \phi_z \phi_{yz}) / (\phi_x^2 + \phi_y^2 + \phi_z^2)^{3/2}.$$

Eq. (18) clearly reduces the problem of computation the mean curvature of a level set surfaces to the simple approximation of first and second order derivatives of the level set function itself. In section 3.3.2 a convenient and fast way to compute the mean curvature, as well as other types of surface curvature, directly form Eq. (16b), are discussed.

3.2 Distance Computations

A level set model is represented by a distance volume, a volume dataset where each voxel stores the shortest distance to the surface of the object being represented by the volume. The inside-outside status of the point is defined by its sign, positive for inside and negative for outside. Since the editing operations focus only in one level set (iso-surface) embedded in, the volume, distance information is only maintained around one level set (usually of iso-value zero). Depending on the accuracy of the integrations scheme this "narrow band" is typically only a five voxels wide (two voxels on each side of the zero level set).

As shown in FIG. 1, before an object can be edited in the system of the present invention, it must first be converted into a narrow-band distance volume. Conversion is provided for polygonal, NURBS, implicit and CSG models, as well as general volumetric models into the appropriate volumetric format. The fundamental operation performed in the conversion process is the calculation of the shortest distance from an arbitrary point to the geometric model being scan converted. Since the calculation is performed repeatedly, efficient computation is essential to minimizing the time needed for conversion.

3.2.1 Narrow Band Approximation

Embodiments of the level set editing operators assume that the models are represented as "narrow-band" distance volumes. However, the level set operators of the present invention do not necessarily produce this representation, signed distance in a narrow band and constant values outside of the band (though they do properly produce the correct zero crossings in the resulting volumes). The level set equation (Eq. (4)) contains no explicit constraints that maintain $\phi$ as a signed distance function as time evolves.

In fact it can be shown that $\phi$ will only remain a distance field for certain restricted types of speed functions, as described by Zhao, H. and Osher, S., and Fedkiw, R in Fast surface reconstruction using the level set method, in *Proc. 1st IEEE Workshop on Variational and Level Set Methods*, 194-202 (2001) and Sapiro, G. in *Geometric Partial Differential Equations and Image Analysis* published by Cambridge University Press, Cambridge, UK (2001) and are hereby incorporated by reference. Additionally, the CSG operations used extensively in the editing system are known not to produce true distance values for all circumstances, as described by Perry, R. and Frisken, S. in Kizamu: A system for Sculpting digital characters, in *Proc. SIGGRAPH* 2001, 47-56 (2001) and Breen, D. and Whitaker R., in A level set approach for the metamorphosis of solid models, in *IEEE Trans. on Visualization and Computer Graphics* 7, 2, 173-192 (2001) and are hereby incorporated by reference.

Therefore the volumetric representation of the models must be reset after each editing operation in order to ensure that $\phi$ is approximately equal to the shortest distance to the zero level set in the narrow band.

After an editing operation, points on the zero level set (iso-surface) of the embedded surface can be found by linearly interpolating the voxel values along grid edges that span zero crossings. These "zero-crossing" edges have endpoints (voxels) whose associated $\phi$ values have opposite signs. The first step in rebuilding $\phi$ in the narrow band after an editing operation consists of creating the list of "active" voxels, those adjacent to a zero crossing. The values at these voxels are then recalculated with a first-order Newton's approximation, $\phi_{new}(x)=\phi_{old}(x)/|\nabla\phi_{old}(x)|$, which is only valid near the zero level set.

The $\phi$ values of the next N layers of voxels that form a narrow band on either side of the active list voxels are approximated by a simple city block distance metric. First, all of the voxels that are adjacent to the active list voxels are found. They are assigned a $\phi$ value that is one plus the smallest $\phi$ value of their 6-connected neighbors in the active list. Next all of the voxels that are adjacent to the first layer, but not in the active list are identified and their $\phi$ values are set to be one plus the smallest value of their 6-connected neighbors. This process continues until a narrow band 1 voxels thick has been created.

3.2.2 Scan Conversion of Polygonal Models

This section describes an algorithm for calculating a distance volume from a 3D closed, orientable polygonal mesh composed of triangular faces, edges, vertices, and normals pointing outwards. The algorithm computes the closest point on and shortest signed distance to the mesh by solving the Eikonal equation, $|\nabla\phi|=1$, by the method of characteristics. The method of characteristics is implemented efficiently with the aid of computational geometry and polyhedron scan conversion, producing an algorithm with computational complexity that is linear in the number of faces, edges, vertices and voxels, as described by Mauch, S. in A fast algorithm for computing the closest point and distance transform, due to appear *in the SIAM Journal on Scientific Computing* and is hereby incorporated by reference. The algorithm is described in detailed this reference, however, a summary of it is given below.

Essentially a characteristic of the solution of the Eikonal equation is defined by a line segment with endpoints x and $\xi$, where $\xi$ is the closest point on a manifold to the point x and the distance to the manifold is $|x-\xi|$. If the manifold is smooth then the line connecting x to $\xi$ is orthogonal to the manifold. If the manifold is not smooth at $\xi$ then the line lies "between" the normals of the smooth parts of the manifold surrounding $\xi$.

A Voronoi diagram is built for the faces, edges and vertices of the mesh, with each Voronoi cell defined by a polyhedron. Scan conversion is then utilized to determine which voxels of the distance volume lie in each Voronoi cell. By definition the face, edge or vertex associated with the Voronoi cell is the closest element on the mesh to the voxels in the cell. The closest point/shortest distance to the element is then calculated for each voxel.

Suppose that the closest point $\xi$ to a grid point x lies on a triangular face. The vector from $\xi$ to x is orthogonal to the face. Thus the closest points to a given face must lie within a triangular prism defined by the edges and normal vector of the face.

Faces produce prisms of both positive and negative distance depending on their relationship to the face's normal vector. The sign of the distance value in the prism in the direction of the normal (outside the mesh) is negative and is positive opposite the normal (inside the mesh). In two dimensions the Voronoi cells are defined as strips with negative and positive distance.

Once the Voronoi diagram is constructed, the polyhedra associated with each cell is scan converted in order to associate the closest face, edge or vertex with each voxel for the shortest distance calculation. Each polyhedron is intersected with the planes that coincide with the grid rows to form polygons. This reduces the problem to polygon scan conversion. For each grid row that intersects the resulting polygon, the left and right intersection points are found and each grid point in between is marked as being inside the polygon. The polyhedra that define the Voronoi cells must be enlarged slightly to make sure that grid points are not missed due to finite precision arithmetic. Therefore, some grid points may be scan converted more than once. In this case, the smaller distance and thus the closer point is chosen.

3.2.3 Superellipsoids

Superellipsoids are used as modeling primitives and region-of-influence (ROI) primitives for some of the operators of the present invention (e.g. FIG. 5). In both cases, a scan-converted representation is needed. The parametric equation for a superellipsoid is $$S(\eta, \omega) = \begin{bmatrix} a_1\cos^{\epsilon1}(\eta)\cos^{\epsilon2}(\omega) \\ a_2\cos^{\epsilon1}(\eta)\sin^{\epsilon2}(\omega) \\ a_3\sin^{\epsilon1}(\eta) \end{bmatrix} \quad (19)$$

where $\eta\in[-\pi/2, \pi/2]$ and $\omega\in[-\pi, \pi]$ are the longitudinal and latitudinal parameters of the surface, $a_1$, $a_2$, $a_3$ are the scaling factors in the X, Y, and Z directions, and $\epsilon1$ and $\epsilon2$ define the shape in the longitudinal and latitudinal directions.

The distance to a point on the surface of a superellipsoid defined at $[\eta,\omega]$ from an arbitrary point P is $$d(\eta,\omega)=\|S(\eta,\omega)-P\|. \quad (20)$$

Squaring and expanding Eq. (20) gives $$\hat{d}(\eta, \omega) = (a_1\cos^{\epsilon1}(\eta)\cos^{\epsilon2}(\omega) - P_x)^2 + \quad (21)$$
$$(a_2\cos^{\epsilon1}(\eta)\sin^{\epsilon2}(\omega) - P_y)^2 + (a_3\sin^{\epsilon1}(\eta) - P_z)^2.$$

The closest point to the superellipsoid from an arbitrary point P can then be calculated by determining the values of $[\eta,\omega]$ which minimize Eq. (21). In general Eq. (21) is minimized with a gradient descent technique utilizing variable step-sizes. The values of $[\eta,\omega]$ may then be plugged into Eq. (19) to give the closest point on the surface of the superellipsoid, which in turn may be used to calculate the shortest distance.

Finding the values of $\eta$ and $\omega$ at the closest point with a gradient descent technique involves calculating the gradient of Eq. (21), $$\nabla\hat{d}=[\partial\hat{d}/\partial\eta,\partial\hat{d}/\partial\omega]. \quad (22)$$

Unfortunately, superellipsoids have a tangent vector singularity near [η,ω] values that are multiples of π/2. To overcome this problem, S is re-parameterized by arc length, as described by do Carno, M. in *Differential Geometry of Curves and Surfaces*, published by Prentice-Hall, Englewood Cliffs, N.J. (1976). Once the steepest descent (on $\hat{d}$) is redefined so that it is steepest with respect to the normalized parameters $(\alpha, \beta)$, the gradient of the re-parameterized $\hat{d}$ can be used, $$\nabla \hat{d}' = [\partial \hat{d}/\partial \alpha, \partial \hat{d}/\partial \beta]. \qquad (23)$$

to find the closest point with greater stability.

The general formulation of Eq. (23) significantly simplifies for values of η and ω near multiples of π/2. Instead of deriving and implementing these simplifications for all regions of the superellipsoid the calculation is only performed in the first octant $(0 \leq \eta \leq \pi/2, 0 \leq \omega \leq \pi/2)$. Since a superellipsoid is 8-way symmetric, point P may be reflected into the first octant, the minimization performed, and the solution point reflected back into P's original octant.

It should be noted that for certain values of $\epsilon 1$ and $\epsilon 2$ the normals of a superellipsoid become discontinuous, producing special degenerate primitives that must be dealt with separately. The most common cases are the cuboid $(\epsilon 1 = \epsilon 2 = 0)$, and the cylinder $(\epsilon 1 = 0, \epsilon 2 = 1)$. The shortest distance to these primitives may be determined by calculating the shortest to each individual face (6 for the cuboid, 3 for the cylinder), and choosing the smallest value.

A faster, but less accurate, alternative for scan-converting any implicit primitive involves utilizing the approximation from Section 3.2.1 at the voxels adjacent to the primitive's surface. Given these voxel values, the distance values at the remaining voxels may be calculated with a Fast Marching Method. See Section 3.2.6. Also, once shortest distance can be calculated for any closed primitive, distance to a Constructive Solid Geometry (CSG) model consisting of combinations of the primitive may also be computed.

3.2.4 NURBS Surfaces

As stated before, Non-Uniform Rational B-Spline (NURBS) surfaces may also be imported into the present system and edited. The teapot model of FIG. 8 was scan converted into a distance volume using an algorithm and software developed by Johnson, D and Cohen, E. as described in A framework for efficient minimum distance calculations, in *Proc. IEEE. Intl. Conf. Robotics & Automation*, 3678-3684 (1998), and is hereby incorporate by reference. They have developed a framework that employs a lower-upper bound (LUB) tree to rapidly calculate the closest point to a complex, concave surface from an arbitrary point.

A small number of operations must be available in order to process a particular surface in the framework. The needed operations are 1) return a bounding volume, 2) return a lower bound on the distance, 3) return an upper bound on the minimum distance, 4) bounding volume refinement, and 5) computation termination. These operations are used in a pruning method that converges on the closest point, and therefore the shortest distance, to the surface.

3.2.5 Point Sets

In some level set editing operators, there is a need to determine the closest point in a set from another arbitrary point. This capability is used during level set blending (when calculating the distance to an intersection "curve") and embossing (moving a level set surface towards a point set).

One embodiment utilizes the ANN library of Mount and Arya. The library calculates closest point queries of a point set in $\mathcal{O} (\log N)$ time by first storing the point set in a hierarchical data structure that partitions the space around the point set into non-overlapping cells. Given an input point; the hierarchical structure is traversed and candidate cells are identified and sorted, as described by Arya, S. Mount, D. and Netanyahu, N., Silverman, R. and Wu, A. in An optical algorithm for approximate nearest neighbor searching, in *Journal of the ACM* 45, 891-923 (1998), and is hereby incorporated by reference. A priority search technique is then utilized to find the closest point (within some tolerance e) in the list of candidate cells, as described by Arya, S. and Mount, D. in Algorithms for fast vector quantization, in *Proc. IEEE Data Compression Conference*, 381-390 (1993), and is hereby incorporated by reference.

When the points are uniformly distributed, the best performance is achieved by storing the point set in a K-D tree, as described by De Berg, M., Van Kreveld, M., Overmars, M. and Schwarzkopf, O. in *Computational Geometry: Algorithms and Applications*, published by Springer, Berlin (1997). For clustered points, storing the point set in the balanced box decomposition (BBD) tree described in Arya, S. Mount, D. and Netanyahu, N., Silverman, R. and Wu, A. in An optical algorithm for approximate nearest neighbor searching, in *Journal of the ACM* 45, 891-923 (1998) produces the fastest result.

3.2.6 Fast Marching Method

Embodiments of the present invention utilize a Fast Marching Method (FMM) to generate distance volumes when given distance values only at voxels immediately adjacent to the zero level set. This can occur when scan-converting implicit primitives, and generating distance volumes from a level set segmentation, as described in Whitaker, R., Breen, D., Museth, K. and Soni, N. in Segmentation of biological datasets using a level-set framework, in *Volume Graphics*, edited by K. Mueller and A. Kaufman, published by Springer, Vienna, 249-263 (2001). The FMM is also used to calculate the distance values needed for the above mentioned morphological operators.

The solution of the Eikonal with the boundary condition $\phi|_S = 0$ (a zero level set) is the distance from the manifold S. The characteristics of the solution are straight lines which are orthogonal to S. The direction in which the characteristics propagate is called the downwind direction. More than one characteristic may reach a given point. In this case the solution is multi-valued. One can obtain a single-valued weak solution by choosing the smallest of the multi-valued solutions at each point. This is a weak solution because $\phi$ is continuous, but not everywhere differentiable. The equation may be efficiently and directly solved by ordering the grid points of the volume, so that information is always propagated in the direction of increasing distance. This is the *Fast Marching Method*, as described by Sethian, J. in A fast marching level set method for monotonically advancing fronts, in *Proceedings of the National Academy of Science* 93, 4, 1591-1595 (1996). It achieves a computational complexity of $\mathcal{O} (N \log N)$.

The Fast Marching Method is similar to Dijkstra's algorithm for computing the single-source shortest paths in a weighted, directed graph. In solving this problem, each vertex is assigned a distance, which is the sum of the edge weights along the minimum-weight path from the source vertex. As Dijkstra's algorithm progresses, the status of each vertex is either known, labeled or unknown. Initially, the source vertex in the graph has known status and zero distance. All other vertices have unknown status and infinite distance. The source vertex labels each of its adjacent neighbors. A known vertex labels an adjacent vertex by setting its status to labeled if it is unknown and setting its distance to be the minimum of its current distance and the sum of the known vertices' weight and the connecting edge weight. It can be shown that the labeled vertex with minimum distance has the correct value. Thus the status of this vertex is set to known, and it labels its neighbors. This process of freezing the value of the minimum labeled vertex and labeling its adjacent neighbors is repeated until no labeled vertices remain. At this point all the vertices that are reachable from the source have the correct shortest path distance. The performance of Dijkstra's algorithm depends on quickly determining the labeled vertex with minimum distance. One can efficiently implement the algorithm by storing the labeled vertices in a binary heap. Then the minimum labeled vertex can be determined in $\mathcal{O}(\log n)$ time where n is the number of labeled vertices.

Sethian's Fast Marching Method differs from Dijkstra's algorithm in that a finite difference scheme is used to label the adjacent neighbors when a grid point becomes known. If there are N grid points, the labeling operations have a computational cost of $\mathcal{O}(N)$. Since there may be at most N labeled grid points, maintaining the binary heap and choosing the minimum labeled vertices makes the total complexity $\mathcal{O}(N \log N)$.

3.3 Solving the Level Set Equation

Several of the editing operators modify geometric objects, represented by volume datasets (a 3D grid), by evolving the level set partial differential equation (PDE) Eq. (4). As was first noted by Osher and Sethian, this PDE can effectively be solved using finite difference (FD) schemes originally developed for Hamilton-Jacobi type PDEs. This effectively corresponds to discretization Eq. (4) on a discrete spatial 3D grid and a temporal 1D grid. The use of such grids raises a number of numerical and computational issues that are important to the accuracy and stability of the implementation. The two central issues are the proper choice of a numerical integration scheme with respect to time, and the development of an appropriate narrow band algorithm for localizing computation in the spatial dimensions. The details of these schemes/algorithms will ultimately affect the stability, accuracy and efficiency of the system.

There exists a large number of so-called implicit and explicit integrations schemes that can be used to propagate Eq. (4) forward in time. The implicit schemes have the advantage of being unconditionally stable with respect to the time-discretization, but typically at the cost of large truncation errors. They also require massive matrix manipulations which makes them hard to implement and more importantly increases the computer time per time step. This is in strong contrast to the explicit methods that are relatively simple to set up and program. The downside however is that the explicit schemes often have stability constraints on the time discretization given a certain space discretization. The exception to this rule are the so-called semi-Lagrangian integration schemes that can be considered unconditionally stable explicit schemes. However is it unclear how to extend the semi-Lagrangian schemes to the general class of PDEs that is related here.

In one embodiment of the present invention, it has been found that, for the level set problems considered in this disclosure, the stability constraints associated with a simple explicit integration scheme like the "forward Euler method"

$$u_{i,j,k}^{n+1} = u_{i,j,k}^n + \Delta t \Delta u_{i,j,k}^n, \quad (24)$$

offers a very good balance of speed, fast update times and simplicity. In this equation $u^n$ denotes the approximation of $\phi(x,t)$ at the nth discrete time step, $\Delta t$ is a time-increment that is chosen to ensure stability, and $\Delta u_{i,j,k}^n$ is the discrete approximation to $\partial \phi / \partial t$ evaluated at grid point $x_{i,j,k}$ and time-step $t_n$. It shall be assumed, without a loss in generality, that the grid spacing is unity. The initial conditions $u^0$ are established by the scan conversion algorithms discussed in the previous sections and the boundary conditions are such that the derivatives toward the outside of the grid are zero (Neumann type).

The next step is to express the time-increment, $\Delta u_{i,j,k}^n$, entering Eq. (24), in terms of the fundamental level set Eq. (4)

$$\Delta u_{i,j,k}^n = F(i,j,k) |\nabla u_{i,j,k}^n| \quad (25a)$$

$$\approx F(i,j,k) \sqrt{\sum_{w \in x,y,z} (\delta_w u_{i,j,k}^n)^2} \quad (25b)$$

where $\delta_w u_{i,j,k}^n$ approximates $\partial u_{i,j,k}^n / \partial w$, i.e. the discretization of the partial derivative of u with respect to the spatial coordinate $w \in x,y,z$. The final step is to express these spatial derivatives as well as the speed function, $\mathcal{F}(i,j,k)$, in terms of finite differences (FD) on the spatial 3D grid. Many different FD schemes with varying stencil and truncation error exist, but to list just the simplest there is $$\frac{\partial u_{i,j,k}^n}{\partial \omega} = \delta_w^+ u_{i,j,k}^n + O(\Delta w) \quad (26a)$$

$$= \delta_w^- u_{i,j,k}^n + O(\Delta w) \quad (26b)$$

$$= \delta_w^\pm u_{i,j,k}^n + O(\Delta w^2) \quad (26c)$$

where short-hand notations have been defined for the following FD expressions as $$\delta_x^+ u_{i,j,k}^n = \frac{u_{i+1,j,k}^n - u_{i,j,k}^n}{\Delta x} \quad (27a)$$

$$\delta_x^- u_{i,j,k}^n = \frac{u_{i,j,k}^n - u_{i-1,j,k}^n}{\Delta x} \quad (27b)$$

$$\delta_x^\pm u_{i,j,k}^n = \frac{u_{i+1,j,k}^n - u_{i-1,j,k}^n}{2\Delta x} \quad (27c)$$

The explicit choice of FD scheme for the first order derivatives in the term $|\nabla u_{i,j,k}^n|$ turns out to be closely related to the functional expression of the speed-term. This is a simple consequence of the fact that the corresponding solutions to the level set PDE with different speed-functions can show very different mathematical behavior. This is formulated more precisely by the so-called CFL condition which will be explained in more details below. There are basically two different classes of such level set PDEs, namely the so-called hyperbolic and parabolic PDEs that will be treated separately in the next two sections. (The third type—the so-called elliptic PDEs—correspond to boundary value problems and are therefore not relevant to the initial-value problems that are being dealt with here).

3.3.1 Hyperbolic Speed Functions

For many level set deformations the speed function can, to some approximation, be assumed to be independent of the level set function itself. This is for instance the case for the embossing operators illustrated in FIG. 1 or simple constant normal flow when performing surface dilation or erosion.

This corresponds to a situation where the level set surface is advected in an external flow field generated by for instance the attraction forces to other geometry like a surface or a set of points. Such advection problems are very common in computational fluid dynamics and the corresponding PDEs, which are called hyperbolic, have the mathematical property that information is propagated in certain directions denoted the characteristics. However, it would seem natural that the explicit finite difference scheme used for solving the corresponding hyperbolic level set equations has to be consistent with the direction with which information propagates throughout space. Indeed, this is nothing more than requiring the numerical scheme to obeying the underlying "physics" of the level, set surface deformation. This is formulated more precisely by the so-called Courant-Friedrichs-Lewy (CFL) stability condition that states the domain of dependence of the discretized FD problem has to include the domain of dependence of the differential equation. in the limit as the length of the FD steps goes to zero. Consequently the stencil used for the FD approximation of the spatial derivatives entering Eq. (25a), should only include sample points (information) from the domain of dependence of the differential equation, i.e. from the side of the zero-crossing opposite to the direction in which it moves—or simply up-wind to the level set surface. This amounts to using a so called up-wind scheme that employs single-sided derivatives like for instance Eqs. (27a) and (27b). The partial derivatives in the term $|\nabla\phi|$, Eq. (25b), are computed using, only those derivatives that are up-wind relative to the movement of the level set. One embodiment uses the upwind scheme described by Whitaker, R. in A level-set approach to 3D reconstruction from range data, in *International Journal of Computer Vision* 29, 3, 203-231, hereinafter referred to as the "IJCV Paper", and hereby incorporated by reference. The preferred embodiment uses the more stable Godunov's method:

$$(\delta_w u_{i,j,k}^n)^2 = \max(\min(\delta_w^+ u_{i,j,k}^n, 0)^2, \max(\delta_w^- u_{i,j,k}^n, 0)^2) \quad (28)$$

when $\mathcal{F}(i,j,k) \leq 0$, and $$(\delta_w u_{i,j,k}^n)^2 = \min(\max(\delta_w^+ u_{i,j,k}^n, 0)^2, \min(\delta_w^- u_{i,j,k}^n, 0)) \quad (29)$$

when $\mathcal{F}(i,j,k) > 0$

Another consequence of the CFL condition is that for the numerical FD scheme to be stable the corresponding numerical wave has to propagate at least as fast as the level set surface—else the numerical scheme simply wont capture the real "physics" of the hyperbolic PDE. Since the physical speed is given by the speed-function, $\mathcal{F}(i,j,k)$ on the surface, S, and the FD scheme (by definition) propagates the numerical information exactly one grid cell (defined by $\{\Delta x, \Delta y, \Delta z\}$) per time iteration this effectively puts upper bounds on the numerical time steps $\Delta t$ in Eq. (24). This can be expressed in the following conservative time step restriction (this expression can also be derived using Von Neumann stability analysis).

$$\Delta t < \frac{\text{Min}(\Delta x, \Delta y, \Delta z)}{\sup_{i,j,k \in S} |F(i,j,k)|}. \quad (30)$$

As a closing remark it is noted that even when the speed function depends on zero or first order partial derivatives of the level set function will it typically show hyperbolic behavior (The explicit classification of the PDE obviously depends on the actual functional dependence of the speed function on $\phi$) and should therefore be discretized using upwind-schemes and CFL time restrictions. This however, is not the case when the speed function depends on higher order partial derivatives of $\phi$, which is exactly the topic of the next sections.

3.3.2 Parabolic Speed Functions

Another very typical scenario is when the speed function depends on the local curvature of the level set surface. This for instance is the case for blending and smoothing/sharpening operators illustrated in FIG. 1. In it simplest form this resembles the so called geometric heat equation $$\frac{\partial \phi}{\partial t} = \alpha K |\nabla \phi| \approx \alpha \nabla^2 \phi \quad (31)$$

where $\alpha$ is a simple scaling parameter and K is the mean curvature, that according to Eq. (16b) can be expressed as $$K = \nabla \cdot \frac{\nabla \phi}{|\nabla \phi|} = \frac{\phi_x^2(\phi_{yy} + \phi_{zz}) - 2\phi_y\phi_z\phi_{yz}}{|\nabla \phi|^3} + \quad (32)$$
$$\frac{\phi_y^2(\phi_{xx} + \phi_{zz}) - 2\phi_x\phi_z\phi_{xz}}{|\nabla \phi|^3} + \frac{\phi_z^2(\phi_{xx} + \phi_{yy}) - 2\phi_x\phi_y\phi_{xy}}{|\nabla \phi|^3}$$

where the short-hand notation $\phi_{xy} \equiv \partial^2\phi/\partial x \partial y$ has been used. If the level set function is normalized to a signed distance function, i.e. $|\nabla \phi|=1$, the geometric heat equation simplifies to the regular (thermo-dynamic) heat equation as indicated in Eq. (31). This type of PDE has a mathematical behavior which is very different from the one described for the hyperbolic PDEs in the previous section. As oppose to the latter, Eq. (31) does not propagate information in any particular direction. More specifically, this so called parabolic PDE has no real characteristics associated with it and hence the corresponding solution at a particular time and position depends (in principle) on the global solution in the past. Consequently parabolic PDEs have no domain of dependence defined from characteristics and one needs to use ordinary central finite difference schemes to discretize the spatial derivatives. So, for first order partial derivatives, entering Eq. (25b), for instance Eq. (27c) can be used, and to evaluate the mean curvature in Eq. (32) FD schemes of the type $$\frac{\partial^2 u_{i,j,k}^n}{\partial x^2} = \frac{u_{i+1,j,k}^n + 2u_{i,j,k}^n + u_{i-1,j,k}^n}{\Delta x^2} + O(\Delta x^2) \quad (33a)$$

$$\frac{\partial^2 u_{i,j,k}^n}{\partial x \partial y} = \frac{u_{i+1,j+1,k}^n - u_{i+1,j-1,k}^n}{4\Delta x \Delta y} \quad (33b)$$

$$+ \frac{u_{i-1,j-1,k}^n - u_{i-1,j+1,k}^n}{4\Delta x \Delta y} + O(\Delta x^2, \Delta y^2) \quad (33c)$$

could be used.

Since parabolic PDE have no mathematical domain of dependence the CFL stability condition described in the previous section does apply—or more correctly isn't sufficient. Instead one has to perform a so-called Von Neuman stability analysis on the FD scheme described above. This is essentially an error analysis in fourier space which leads to the following stability constraint on the time steps $$\Delta t < \left(\frac{2\alpha}{\Delta x^2} + \frac{2\alpha}{\Delta y^2} + \frac{2\alpha}{\Delta z^2}\right)^{-1}. \quad (34)$$

It should be noted that in this stability constraint $\Delta t$ is $O(\Delta w^2)$ which is significantly more stringent than in the hyperbolic case in Eq. (30) where $\Delta t$ is only $O(\Delta w)$. This is a consequence of the fact that the CFL condition is a necessary but not always sufficient stability conditions for a numerical FD scheme.

3.3.3 Non-Linear Speed Functions

In the two previous sections the numerical FD schemes has been used to solve two relatively simple cases when the speed function is either independent of q or linearly dependent on the mean curvature of the level set surface. However for some of the editing operators illustrated in FIG. 1 the situation is not so simple. This is for instance the case for the blending and smoothing operators where a non-linear filter or cutting-function is applied to the mean curvature flow in order to control surface properties of the final surface. Other examples are when the geometric flow depends on other curvature measures like the principle curvatures. In these cases the corresponding level set PDE cannot to classified as being either hyperbolic or parabolic which complicated the choice of underlying discretization. As a result great care has be taken and some experimentation is almost inevitable. Therefore only the case of non-linear dependence on the mean curvature used in the blending and smoothing operations shall be addressed.

First it is noted that the central finite differences scheme described in the previous section occasionally produces instabilities and small oscillations. As an alternative, a different FD scheme for mean curvature is used, one that proved more stable and also had the added benefit of easily allowing for the computations of other types of curvature. This scheme is the topic of the reminder of this section.

The principle curvatures and principle directions are the eigenvalues and eigenvectors of the shape matrix. For an implicit surface, the shape matrix is the derivative of the normalized gradient (surface normals) projected onto the tangent plane of the surface. If the normals is let to be $n = \nabla \phi / |\nabla \phi|$, the derivative of this is the 3×3 matrix $$N = \left(\frac{\partial n}{\partial x} \frac{\partial n}{\partial y} \frac{\partial n}{\partial z}\right)^T. \quad (35)$$

The projection of this derivative matrix onto the tangent plane gives the shape matrix $B = N(I - n \oplus n)$, where $\oplus$ is the exterior product. The eigenvalues of the matrix B are $k_1$, $k_2$ and zero, and the eigenvectors are the principle directions and the normal, respectively. Because the third eigenvalue is zero, $k_1$, $k_2$ and various differential invariants can be computed directly from the invariants of B. Thus the weighted curvature flow is computing from B using the identities $D = \|B\|_2$, $H = \text{Tr}(B)/2$, and $K = 2H^2 - D^2/2$. The choice of numerical methods for computing B is discussed in the following section. The principle curvature are calculated by solving the quadratic $$k_{1,2} = H \pm \sqrt{\frac{D^2}{2} - H^2}. \quad (36)$$

Figure 12:
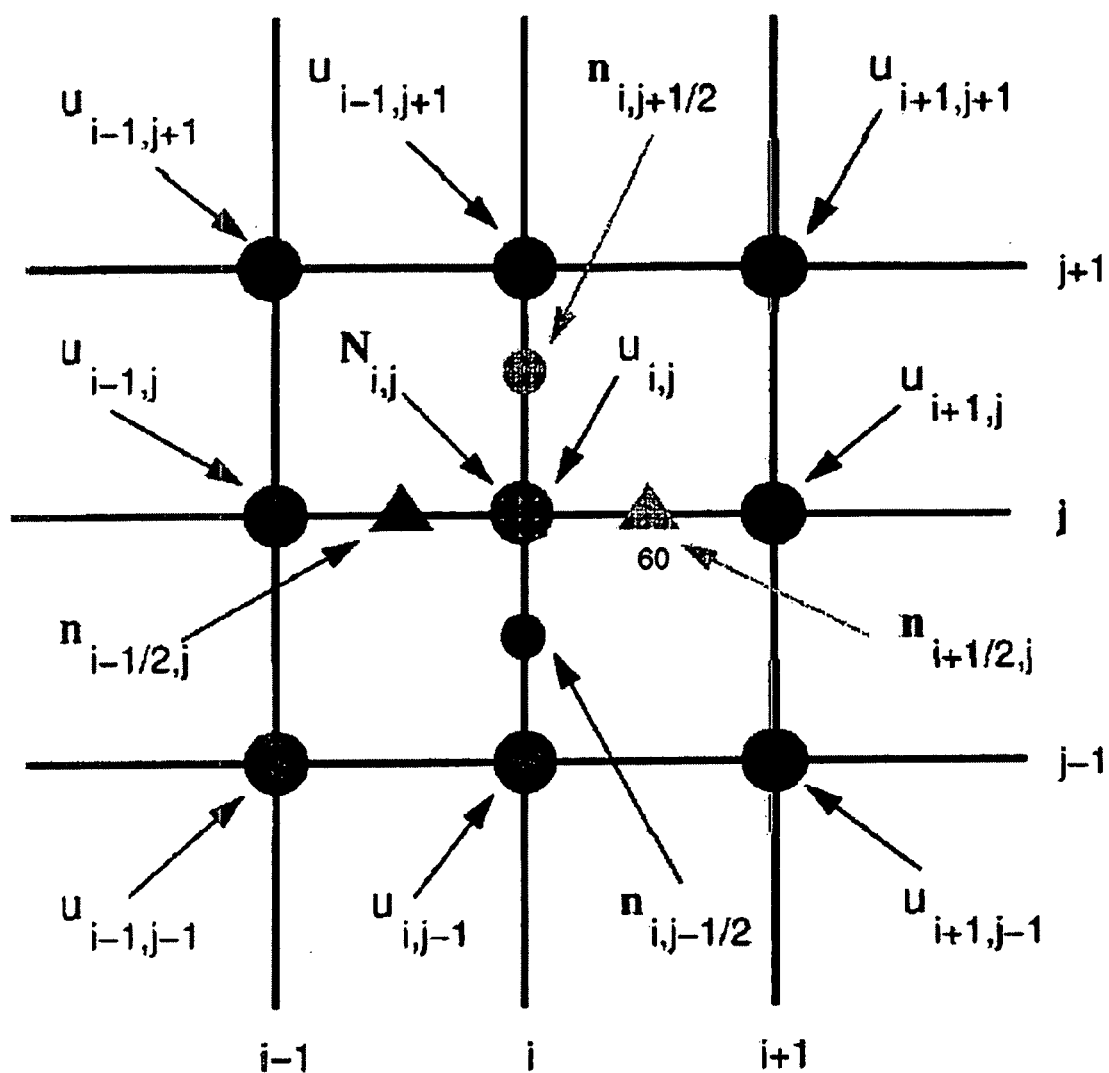
FIG. 12 depicts an example of the method of differences of normals according to one embodiment of the present invention.

In many circumstances, the curvature term, which is a kind of directional diffusion, which does not suffer from overshooting, can be computed directly from first- and second-order derivatives of $\phi$ using central difference schemes. However, it has been found that central differences do introduce instabilities when computing flows that rely on quantities other than the mean curvature. Therefore the method of differences of normals is used in lieu of central differences. The strategy is to compute normalized gradients at staggered grid points and take the difference of these staggered normals to get centrally located approximations to N. See FIG. 12. The shape matrix B is computed with gradient estimates from central differences. The resulting curvatures are treated as speed functions (motion in the normal direction), and the associated gradient magnitude is computed using the up-wind scheme. For instance the normal vector centered at triangle 60 in FIG. 12 is approximated using the following first order difference expressions $$\frac{\partial u^n_{i+\frac{1}{2},j,k}}{\partial x} = \delta_x^+ u^n_{i,j,k} + O(\Delta x) \quad (37a)$$

$$\frac{\partial u^n_{i+\frac{1}{2},j,k}}{\partial y} = \frac{1}{2}(\delta_y u^n_{i+1,j,k} + \delta_y u^n_{i,j,k}) + O(\Delta y) \quad (37b)$$

$$\frac{\partial u^n_{i+\frac{1}{2},j,k}}{\partial z} = \frac{1}{2}(\delta_z u^n_{i+1,j,k} + \delta_z u^n_{i,j,k}) + O(\Delta z) \quad (37c)$$

which involve the six nearest neighbors (18 in 3D).

The stability constrains on the non-linear level set PDEs can also be hard to estimate since the usual Von Neumann stability analysis typically cannot be performed. For practical purposes the conservative time constraints of the parabolic PDE has been found to give good estimates for $\Delta t$.

3.3.4 Summary of Finite Difference Algorithm

Thus, the steps for computing level set model evolutions are:
1. Initialize model volume $u^0$ using one of the distance calculations described in Section 3.2.
2. $v_{max} = 0$
3. For each voxel (i,j,k):
   (a) Calculate $\mathcal{F}$ (i,j,k).
   (b) $v_{max} = \text{MAX}(|\mathcal{F}(i,j,k)|, v_{max})$
   (c) Calculate derivatives and the total change at (i,j,k) using nearest neighbors according to the FD schemes given in the previous sections.
   (d) Save $\Delta u_{i,j,k}{}^n$ in a separate volume.
4. Compute $\Delta t$ according to Eq. (30) or Eq. (34).
5. For each voxel (i,j,k):
   (a) Update $u_{i,j,k}{}^{n+1}$ according to Eq. (24)
6. If the incremental change in the model is below threshold, done. Otherwise go to step 3

3.3.5 Sparse-Field Solutions

The up-wind solution to the equations described in the previous section evolves the level set model over the entire range of the embedding, i.e., for all values of k in Eq. (1). However, this method requires updating every voxel in the volume for each iteration, making the computation time a function of the volume rather than the surface area of the model. Because surface editing only requires a single model (level set), it is unnecessary to calculate solutions over the entire range of iso-values.

The literature has shown that computations can be limited by the use of narrow-band methods, which compute solutions only in the narrow band of voxels that surround the level set of interest. In previous work the IJCV Paper (Whitaker, R. in A level-set approach to 3D reconstruction from range data, in *International Journal of Computer Vision* 29, 3, 203-231, and hereby incorporated by reference) described an alternative numerical algorithm, called the sparse-field method, that evaluates the level set in a small subset of voxels in the range and requires a fraction of the computation time required by previous algorithms. There are two advantages to this method. The first is a significant improvement in computation times. The second is increased accuracy when fitting models to forcing functions that are defined to sub-voxel accuracy. Embodiments of the present invention use the sparse-field algorithm.

A more detailed description of the sparse-field algorithm is found in the IVJCV Paper. A basic description is provided below. In essence, the sparse-field algorithm takes advantage of the fact that a k-level surface, S, of a discrete image u (of any dimension) has a set of cells through which it passes. Only those grid points and their nearest neighbors are relevant to the evolution of that curve. The set of grid points adjacent to the level set is called the active set, and the individual elements of this set are called active points. As a first-order approximation, the distance of the level set from the center of any active point is proportional to the value of u divided by the gradient magnitude at that point. The evolution given by Eq. (4) on the active set is computed. Then the neighborhood around the active set is updated using a fast "city-block" approximation to the distance transform. See Section 3.2.1. Because active points must be adjacent to the level set model, their positions lie within a fixed distance to the model. Therefore the values of u for elements in the active set must lie within a certain range of grayscale values. When active point values move out of this active range they are no longer adjacent to the model. They must be removed from the set and other grid points, those whose values are moving into the active range, must be added to take their place. The precise ordering and execution of these operations is important to the operation of the algorithm.

The values of the points in the active set can be updated using the up-wind scheme described in the previous section. In order to maintain stability, one must update the neighborhoods of active grid points in a way that allows grid points to enter and leave the active set without those changes in status affecting their values. Grid points should be removed from the active set when they are no longer the nearest grid point to the zero crossing. If it is assumed that the embedding u is a discrete approximation to the distance transform of the model, then the distance of a particular grid point, (i,j,k), to the level set is given by the value of u at that grid point. If the distance between grid points is defined to be unity, then a point should be removed from the active set when the value of u at that point no longer lies in the interval $[-\frac{1}{2}, \frac{1}{2}]$. If the neighbors of that point maintain their distance of 1, then those neighbors will move into the active range just as (i,j,k) is ready to be removed.

There are two operations that are significant to the evolution of the active set. First, the values of u at active points change from one iteration to the next. Second, as the values of active points pass out of the active range they are removed from the active set and other neighboring grid points are added to the active set to take their place. Formal definitions of active sets and the operations that affect them are detailed in the IJCV Paper, and it is shown that active sets will always form a boundary between positive and negative regions in the image, even as control of the level set passes from one set of active points to another.

Because grid points that are near the active set are kept at a fixed value difference from the active points, active points serve to control the behavior of adjacent nonactive grid points. The neighborhoods of the active set are defined in layers, $L_{+1}, \ldots, L_{l}, \ldots, L_{+N}$ and $L_{-1}, \ldots, L_{-l}, \ldots, L_{-N}$, where the l indicates the (city block) distance from the nearest active grid point, and negative numbers are used for the outside layers. For notational convenience the active set is denoted $L_0$. The number of layers should coincide with the size of the footprint or neighborhood used to calculate derivatives. In this way, the inside and outside grid points undergo no changes in their values that affect or distort the evolution of the zero set. Embodiments of the present invention use second-order derivatives of $\phi$, which are calculated using nearest neighbors (6 connected). Therefore only 5 layers are necessary (2 inside layer, 2 outside layer, and the active set). These layers are denoted $L_2, L_1, L_{-1}, L_{-2}$, and $L_0$. The active set has grid point values in the range $[-\frac{1}{2}, \frac{1}{2}]$. The values of the grid points in each neighborhood layer are kept 1 unit from the next layer closest to the active set.

In one embodiment of the invention, this algorithm can be implemented efficiently using linked-list data structures combined with arrays to store the values of the grid points and their states. The linked-list data structures provide efficient access to those grid points with values and status that must be updated. This requires only those grid points whose values are changing, the active points and their neighbors, to be visited at each time step. The computation time grows as $m^2$, where m is the number of grid-points along one dimension of U (sometimes called the resolution of the discrete sampling). The $m^2$ growth in computation time for the sparse-field models is consistent with conventional (parameterized) models, for which computation times increase with surface area rather than volume.

Another advantage of the sparse-field approach is higher effective resolution. Eq. (4) describes a process whereby all of the level sets of $\phi$ are pushed toward the zero-set of $\mathcal{F}$ ( ). The result is a shock, a discontinuity in $|\nabla\phi|$. In discrete volumes these shocks take the form of high-contrast areas, which cause aliasing in the resulting models. This results in surface models that are unacceptable for many computer graphics applications.

When using the sparse-field method, the active points serve as a set of control points on the level set. Changing the values of these voxels changes the position of the level set. The forcing function is sampled not at: the grid point, but at the location of the nearest level set, which generally lies between grid points. Using a first-order approximation to $\phi$ produces results that avoid the aliasing problems associated with the shocks that typically occur with level set models. Previous work such as the IJCV Paper has shown significant increases in the accuracy of fitting level set models using the first-order modification to the sparse-field method.

More details on the sparse-field method and its properties can be found in the IJCV Paper, which has been incorporated by reference.

3.3.6 Level Set Subvolumes

One of the most effective techniques for increasing interactivity in the present level set editing system involves restricting computations to a subregion of the volume dataset. This is feasible because many of the editing operators by their very nature are local. The selection of the proper subvolume during the editing process is implemented with grid-aligned bounding boxes. Having the bounding boxes axis-aligned makes them straightforward to compute and manipulate, and having them grid-aligned guarantees that intersections directly correspond to valid subvolumes. The bounding box position and size are based on the geometric primitive, e.g. superellipsoid, triangle mesh or point set, utilized by a particular operator.

Employing bounding boxes within the local level set editing operators (blending, smoothing, sharpening and embossing) significantly lessens the computation time during the editing process. These operators are defined by speed functions ($\mathcal{F}(\,)$) that specify the speed of the deformation on the surface. For the smoothing, sharpening and embossing operators, the user specifies the portion of the model to be edited by positioning a region-of-influence (ROI) primitive. The speed function is defined to be zero outside of the ROI primitive. During a blending operation a set of intersection voxels (those containing both surfaces being blended) are identified and blending only occurs within a user-specified distance of these voxels. The speed function is zero beyond this distance. In both cases no level set computation is needed in the outer regions. Given the ROI primitive and the distance information from the set of intersection voxels, a grid/axis-aligned bounding box that contains only those regions where the speed function is non-zero can be defined. A subvolume is "carved" out from the complete model by performing a CSG intersection operation with the signed distance field associated with the bounding box and the model's volume. The resulting subvolume is then passed to the level set solver, and inserted back into the model's volume after processing.

3.4 Efficient Mesh Extraction

As indicated by component 32 in FIG. 1, level set surfaces may either be rendered directly by means of ray casting or indirectly by a simple two-step procedure (a polygonal mesh is extracted from the volume dataset and rasterized on graphics hardware). The latter has been found to perform and scale better with the size of the test volumes. Implementing a few straightforward mesh extraction procedures make the overhead of the indirect rendering approach insignificant. Conventional graphics hardware is then capable of providing interactive frame-rates for all of the models presented in this disclosure. These procedures are described below.

3.4.1 Fast Marching Cubes

First it is noted that much work has been presented over the years on improving the quality of the triangular mesh produced by the Marching Cubes (MC) algorithm. However, these improvements come at a cost, and sacrifice speed for improved mesh structure. Fortunately, the simplicity of the original MC algorithm allows for easy optimization in the mesh extraction of the level set editing system.

The first optimization relies the fact that level set models are represented by a signed distance field. This allows one embodiment to easily leapfrog through the volume as opposed to marching through the entire volume. An effective implementation of this idea is simply to increment in innermost loop in the triple-nested for-loop of the MC algorithm by the distance of the current voxel value (i.e. floor[$|u_{i,j,k}^n|$]) (in i,j,k). While more sophisticated space-pruning schemes can certainly be designed, this straightforward step has been found to balance well the potential complexity of leapfrogging and the relatively fast case table look-up of the MC algorithm.

Another variation of the MC algorithm that works effectively with the present level set models utilizes the sparse-field representation presented in Section 3.3.5. Since the sparse-field method implements a narrow-banded distance field with a linked list of active voxels, it is known at each step which voxels contain the level set of interest. The list is traversed and only those voxels needed to generate the MC mesh are processed.

3.4.2 Incremental Mesh Extraction

Even though the procedures described so far significantly improve the original MC algorithm they still do not make the indirect rendering approach truly interactive. Fortunately there are other algorithms that can be employed to achieve the goal of interactive rendering of the deforming level set surfaces. Mesh extraction can be significantly accelerated by incrementally updating the mesh only in regions where the level set surface changes.

The process starts by making the following observations about the bounding boxes introduced in Section 3.3.6. First, the definition of the speed functions that utilize bounding boxes guarantees that the mesh outside of the bounding boxes is unchanged after a local editing operation. Second, the bounding boxes are by definition grid-aligned and all vertices of a MC mesh lie, by construction, on grid edges. These observations lead to the following incremental mesh extraction algorithm. Given a complete global mesh the process first trims away all triangles with vertices inside a bounding box. Next, for each subsequent iteration of the level set calculation, new triangles are only extracted from the sub-volume defined by the bounding box. The resulting new triangles are then incrementally added to the trimmed mesh, which by construction properly connect without the need for additional triangle clipping.

Given the collection of these procedures the mesh of the deforming level set surface may be interactively displayed while the level set equation is being iteratively solved, allowing the user to view the evolving surface and terminate processing once a desired result is achieved.

4 Embodiment of Computer Execution Environment (Hardware)

Figure 13:
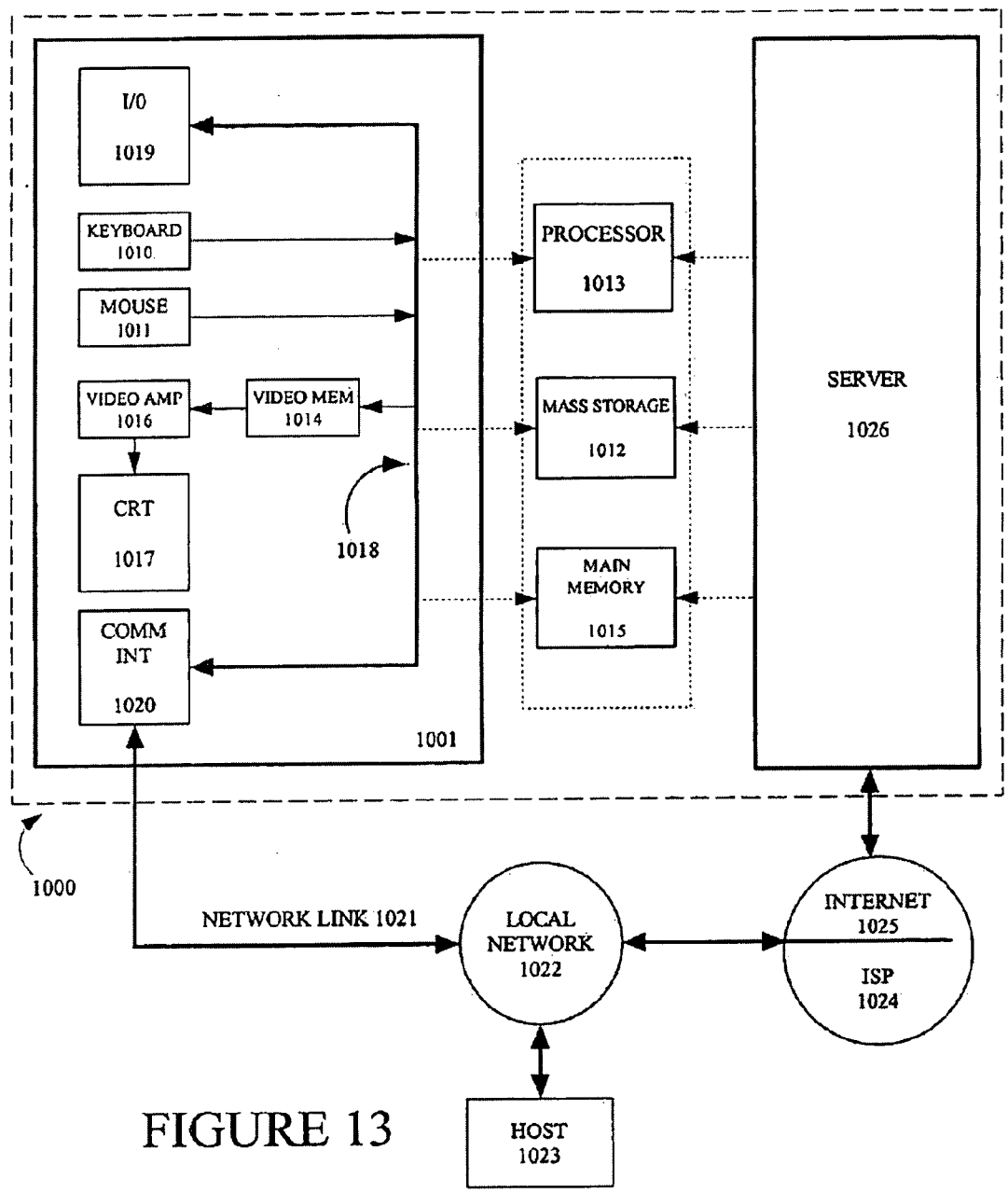
FIG. 13 depicts a general computer embodiment.

One or more embodiments of the present invention that perform level set modeling and surface editing are implemented in computer software running on a plurality of general purpose computing devices as shown in FIG. 13.

A keyboard 1010 and mouse 1011 are coupled to a system bus 1018. The keyboard and mouse are for introducing user input to the computer system and communicating that user input to central processing unit (CPU) 1013. Other suitable input devices may be used in addition to, or in place of, the mouse 1811 and keyboard 1010. I/O (input/output) unit 1019 coupled to bi-directional system bus 1018 represents such I/O elements as a printer, A/V (audio/video) I/O, etc.

Computer 1801 may include a communication interface 1020 coupled to bus 1018. Communication interface 1020 provides a two-way data communication coupling via a network link 1021 to a local network 1022. For example, if communication interface 1020 is an integrated services digital network (ISDN) card or a modem, communication interface 1020 provides a data communication connection to the corresponding type of telephone line, which comprises part of network link 1021. If communication interface 1020 is a local area network (LAN) card, communication interface 1020 provides a data communication connection via network link 1021 to a compatible LAN. Wireless links are also possible. In any such implementation, communication interface 1020 sends and receives electrical, electromagnetic or optical signals which carry digital data streams representing various types of information.

Network link 1021 typically provides data communication through one or more networks to other data devices. For example, network link 1021 may provide a connection through local network 1022 to local server computer 1023 or to data equipment operated by ISP 1024. ISP 1024 in turn provides data communication services through the world wide packet data communication network now commonly referred to as the "Internet" 1025. Local network 1022 and Internet 1025 both use electrical, electromagnetic or optical signals which carry digital data streams. The signals through the various networks and the signals on network link 1021 and through communication interface 1020, which carry the digital data to and from computer 1000, are exemplary forms of carrier waves transporting the information.

Processor 1013 may reside wholly on client computer 1001 or wholly on server 1026 or processor 1013 may have its computational power distributed between computer 1001 and server 1026. Server 1026 symbolically is represented in FIG. 10 as one unit, but server 1026 can also be distributed between multiple "tiers". In one embodiment, server 1026 comprises a middle and back tier where application logic executes in the middle tier and persistent data is obtained in the back tier. In the case where processor 1013 resides wholly on server 1026, the results of the computations performed by processor 1013 are transmitted to computer 1001 via Internet 1025, Internet Service Provider (ISP) 1024, local network 1022 and communication interface 1020. In this way, computer 1001 is able to display the results of the computation to a user in the form of output.

Computer 1001 includes a video memory 1014, main memory 1015 and mass storage 1012, all coupled to bi-directional system bus 1018 along with keyboard 1010, mouse 1011 and processor 1013. As with processor 1013, in various computing environments, main memory 1015 and mass storage 1012, can reside wholly on server 1026 or computer 1001, or they may be distributed between the two. Examples of systems where processor 1013, main memory 1015, and mass storage 1012 are distributed between computer 1001 and server 1026 include the thin-client computing architecture, personal digital assistants, Internet ready cellular phones and other Internet computing devices.

The mass storage 1012 may include both fixed and removable media, such as magnetic, optical or magnetic optical storage systems or any other available mass storage technology. Bus 1018 may contain, for example, thirty-two address lines for addressing video memory 1014 or main memory 1015. The system bus 1018 also includes, for example, a 32-bit data bus for transferring data between and among the components, such as processor 1013, main memory 1015, video memory 1014 and mass storage 1012. Alternatively, multiplex data/address lines may be used instead of separate data and address lines.

In one embodiment of the invention, the processor 1013 can be any suitable microprocessor or microcomputer. Main memory 1015 is comprised of dynamic random access memory (DRAM) or other equivalent memory types. Video memory 1014 is a dual-ported video random access memory. One port of the video memory 1014 is coupled to video amplifier 1016. The video amplifier 1016 is used to drive the cathode ray tube (CRT) raster monitor 1017. Video amplifier 1016 is well known in the art and may be implemented by any suitable apparatus. This circuitry converts pixel data stored in video memory 1014 to a raster signal suitable for use by monitor 1017. Monitor 1017 is a type of monitor suitable for displaying graphic images.

Computer 1001 can send messages and receive data, including program code, through the network(s), network link 1021, and communication interface 1020. In the Internet example, remote server computer 1026 might transmit a requested code for an application program through Internet 1025, ISP 1024, local network 1022 and communication interface 1020. The received code may be executed by processor 1013 as it is received, and/or stored in mass storage 1012, or other non-volatile storage for later execution. In this manner, computer 1000 may obtain application code in the form of a carrier wave. Alternatively, remote server computer 1026 may execute applications using processor 1013, and utilize mass storage 1012, and/or video memory 1015. The results of the execution at server 1026 are then transmitted through Internet 1025, ISP 1024, local network 1022 and communication interface 1020. In this example, computer 1001 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and system for level set surface editing and modeling has been described in conjunction with one or more specific embodiments. The invention is defined by the following claims and their full scope of equivalents.

We claim:

1. A system for level set surface editing comprising:
   a general purpose computing device; and
   a non-transitory computer-readable medium encoded with program modules executable by the computing device, wherein the computing device is directed by the program modules to,
   receive an input model of a three-dimensional surface and output a completed level set model of the surface modeled by the input model, wherein said input model is either a volumetric model of the surface, or a geometric model of the surface which has been converted into a volumetric model of the surface;
   apply one or more level set surface editing operators selected from a group consisting of a CSG Intersection and Difference operator, a CSG Union operator, a level set blending operator, a level set smoothing/sharpening operator, a point extraction operator, and a morphological opening/closing operator to the completed level set model and generate an edited level set model, wherein each level set surface editing operator provides functions for editing a three-dimensional model of a surface; and
   render the edited level set model, wherein said rendering comprises either rendering directly using a ray casting procedure, or rendering indirectly by first extracting a polygonal mesh representation of the surface modeled by the edited level set model and then rasterizing the mesh representation.

2. The level set surface editing system of claim 1 wherein the program module for receiving an input model and outputting a level set model comprises using a 3D scan converter module.

3. The level set surface editing system of claim 2 wherein the input model comprises one of a polygon mesh model, or a Non-Uniform Rational B-Spline model, or a CSG model, or an implicit model.

4. The level set surface editing system of claim 1 wherein the program module for receiving an input model and outputting a level set model comprises using a distance calculator module.

5. The level set surface editing system of claim 4 wherein the input model comprises a scanned volume.

6. The level set surface editing system of claim 1 wherein the program module for rendering the edited level set model comprises employing a volume rendering technique.

7. The level set surface editing system of claim 1 wherein the program module for rendering the edited level set model comprises employing a mesh extracting technique.

8. The level set surface editing system of claim 1, wherein the non-transitory computer-readable medium is encoded with additional program modules executable by the computing device, wherein the computing device is further directed by the additional program modules to:
  apply one or more level set surface editing operators to the edited level set model and generate a revised edited level set model, wherein each level set surface editing operator provides functions for editing a three-dimensional model of a surface; and
  render the revised edited level set model, wherein said rendering comprises either rendering directly using a ray casting procedure, or rendering indirectly by first extracting a polygonal mesh representation of the surface modeled by the edited level set model and then rasterizing the mesh representation.

\* \* \* \* \*